United States Patent [19]

Azumaya et al.

[11] Patent Number: 5,465,307
[45] Date of Patent: Nov. 7, 1995

[54] PARALLEL PROCESSING APPARATUS FOR RECOGNIZING AN AREA MARKED WITH A CLOSED LOOP

[75] Inventors: Kengo Azumaya; Yoshiyuki Hirayama; Kazuhiro Tasaki, all of Saitama, Japan

[73] Assignee: Fuji Xerox Co., Ltd., Tokyo, Japan

[21] Appl. No.: 93,930

[22] Filed: Jul. 20, 1993

[30] Foreign Application Priority Data

Jul. 21, 1992 [JP] Japan ..................... 4-193627

[51] Int. Cl.⁶ ..................... G06K 9/20
[52] U.S. Cl. .............. 382/165; 358/453; 358/538; 382/191; 382/291; 382/304
[58] Field of Search ................. 382/61, 17, 9, 382/48, 41, 49; 358/538, 453; 395/163

[56] References Cited

U.S. PATENT DOCUMENTS

| | | | |
|---|---|---|---|
| 4,538,182 | 8/1985 | Saito et al. | 382/61 |
| 4,893,258 | 1/1990 | Sakuragi | 382/47 |
| 5,029,224 | 7/1991 | Fujisawa | 358/453 |
| 5,130,791 | 7/1992 | Abe | 358/453 |
| 5,216,498 | 6/1993 | Matsunawa et al. | 382/17 |
| 5,241,609 | 8/1993 | Hasebe et al. | 382/17 |

FOREIGN PATENT DOCUMENTS 63-232677  9/1988  Japan.

*Primary Examiner*—Michael T. Razavi
*Assistant Examiner*—Jon Chang
*Attorney, Agent, or Firm*—Finnegan, Henderson, Farabow, Garrett & Dunner

[57] ABSTRACT

An area recognition apparatus is provided with a mark detecting device for detecting a mark portion drawn on an original document to designate a specific area, on the basis of image data read from an original document, crossing portion detecting device for detecting the portion where the mark portion crosses an image portion on the original document, on the basis of the image data, and a closed loop recognizing device for recognizing a closed loop formed by the mark portion and the crossing portion, on the basis of the results of detection by the mark portion detecting device and the crossing portion detecting device.

8 Claims, 19 Drawing Sheets

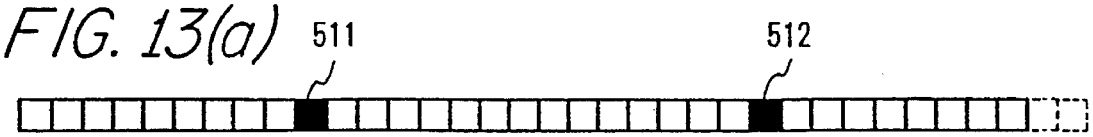
FIG. 13(a)
FIG. 13(b)
FIG. 13(c)
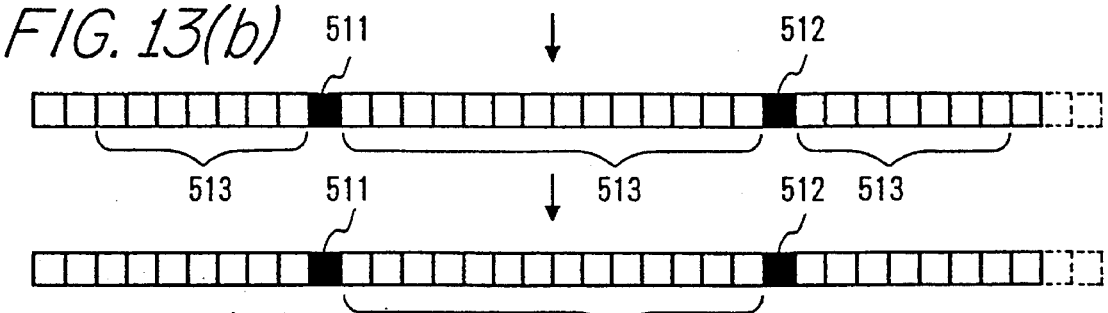
FIG. 14
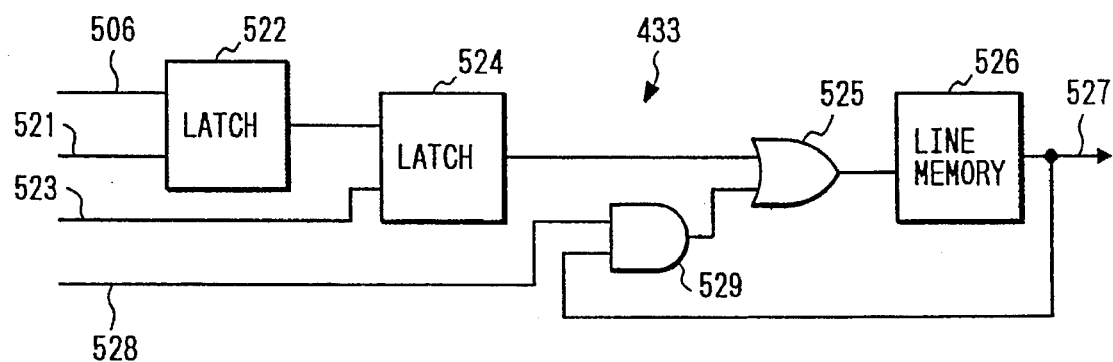
FIG. 15
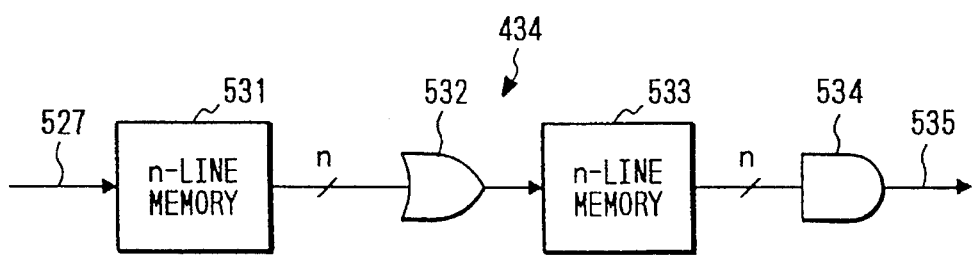

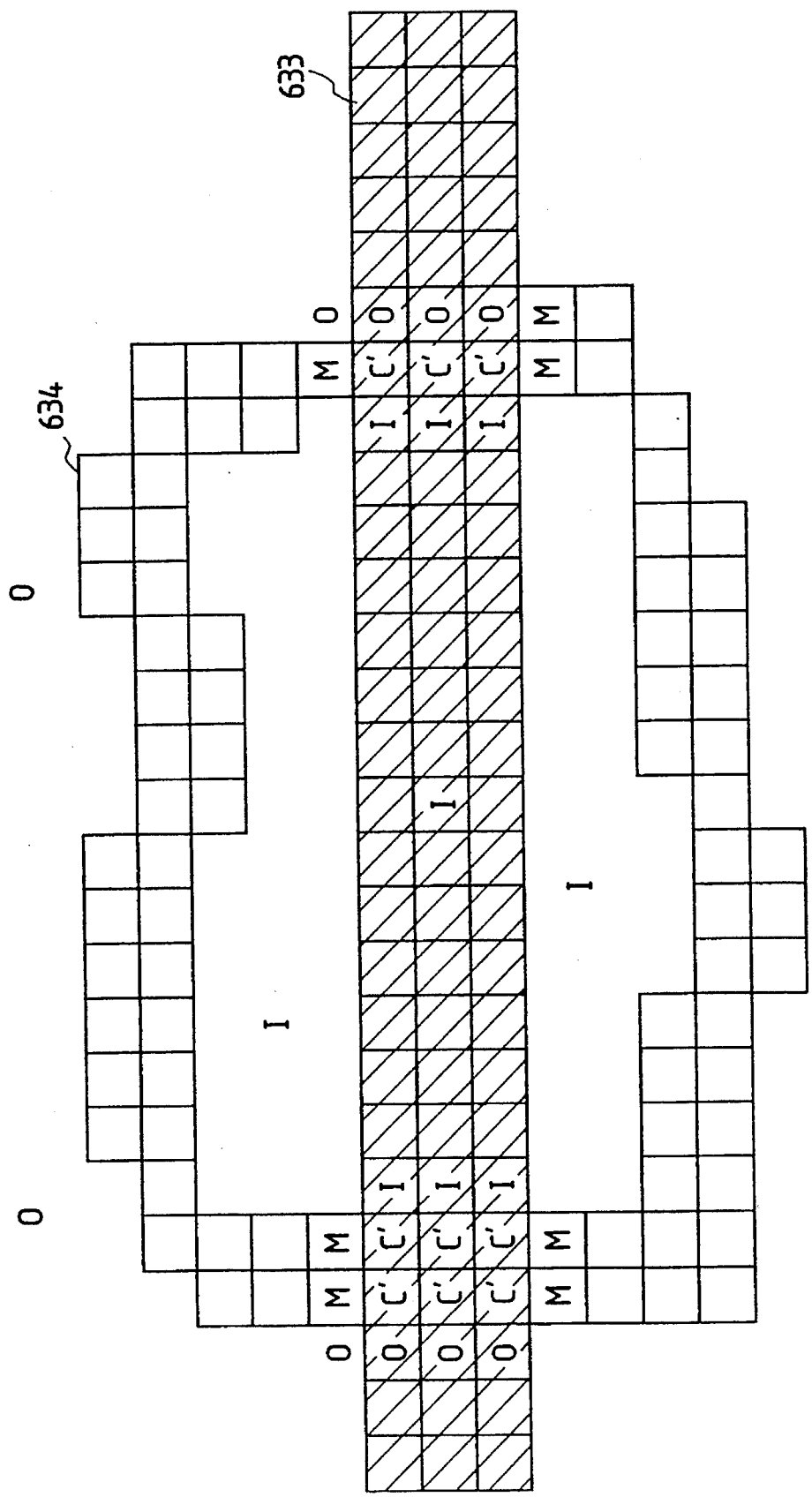

PARALLEL PROCESSING APPARATUS FOR RECOGNIZING AN AREA MARKED WITH A CLOSED LOOP

BACKGROUND OF THE INVENTION

The present invention relates to an area recognition apparatus for recognizing an area marked with a closed loop on an original document.

In handling an image input/output system for a digital copying machine, a special operation is frequently required to process an image in a manner that a part of an image is cut out, moved to another location, or the like. In such a case, Unexamined Japanese Patent Publication No. Sho. 63-232677 discloses a method to process an image area by marking with a closed loop on the original document.

The conventional method detects color data and density data of an area designation mark drawn on the original document, and then determines whether or not an aimed pixel locates inside or outside the closed loop, on the basis of the detected data. However, when the mark and an image overlap, the mark cannot form a complete closed loop. Therefore, the conventional method fails to normally recognize the area, and fails to process the image by designating a specified area of the image with the mark.

SUMMARY OF THE INVENTION

The present invention has been made in view of the above circumstances and has an object to provide an area recognition apparatus which can recognize a specified area even when an area designation mark intersects an image.

To achieve the above object, there is provided an area recognition apparatus comprising a mark portion detecting device for detecting a mark portion drawn on an original document to designate a specific area, on the basis of image data read from an original document, a crossing portion detecting device for detecting the portion where the mark portion crosses an image portion on the original document, on the basis of the image data, and a closed loop recognizing device for recognizing a closed loop formed by the mark portion and the crossing portion, on the basis of the results of detection by the mark portion detecting device and the crossing portion detecting device.

With such an arrangement, the mark portion detecting device detects a mark portion on the basis of image data read from an original document, and the crossing portion detecting device detects a the portion where the mark portion crosses an image portion on the original document. The closed loop recognizing device recognizes a closed loop formed by the mark portion and the crossing portion.

In the area recognition apparatus thus arranged, the closed loop recognizing device includes an area determining device for determining an area to be inside or outside the closed loop.

In the area recognition apparatus, the area recognizing device recognizes an area by treating the crossing portion equivalent to the mark portion.

The closed loop recognizing device of the area recognition apparatus includes the area determining device for determining the areas inside and outside the closed loop and the area of the mark portion.

The area determining device of the area recognition apparatus deems the crossing portion as the mark portion.

The crossing portion detecting device of the area recognition apparatus includes a reference altering device for altering the reference for determining the crossing portion.

The crossing portion detecting device of the area recognition apparatus includes an image portion detecting device for detecting an image portion on an original document by comparing density data contained in the image data with a variable density reference, and the crossing portion determining device for whether or not the image portion detected by the image portion detecting device consists of the crossing portion of it and the mark portion.

The crossing portion determining device of the area recognition apparatus determines whether or not an aimed pixel belongs to the crossing portion on the basis of a pattern of the image data of the aimed pixel and pixels surrounding the aimed pixel.

BRIEF DESCRIPTION OF THE DRAWINGS

In the accompanying drawings;

FIGS. 13(a)–13(c) are other explanatory diagrams showing the operation of the main-scan marker correcting circuit shown in FIG. 11;

FIG. 14 is a block diagram showing an arrangement of a sampling circuit in the marker flag generating device shown in FIG. 9;

FIG. 15 is a block diagram showing an arrangement of a sub-scan marker correcting circuit used in the marker flag generating device shown in FIG. 9;

FIG. 29 is an explanatory diagram showing a pattern to be determined as crossing portions where a horizontal line crosses a marker;

DETAILED DESCRIPTION OF THE PREFERRED EMBODIMENT

The preferred embodiment of the present invention will be described with reference to FIGS. 1 through 38. In the description to follow, the present invention is embodied into a digital copying machine.

The digital copying machine of this embodiment comprises an image scanner section with a page memory for reading an image on an original document with a full color image sensor, and storing the read image data that are variously processed and edited into the page memory, and a print section for printing out the image data from the scanner section in a multiple of colors. The image scanner section is provided with a control panel on which a user designates the number of copies, various types of image processing/edit functions. A desired copy can be produced through the designations by the user.

Figure 1:
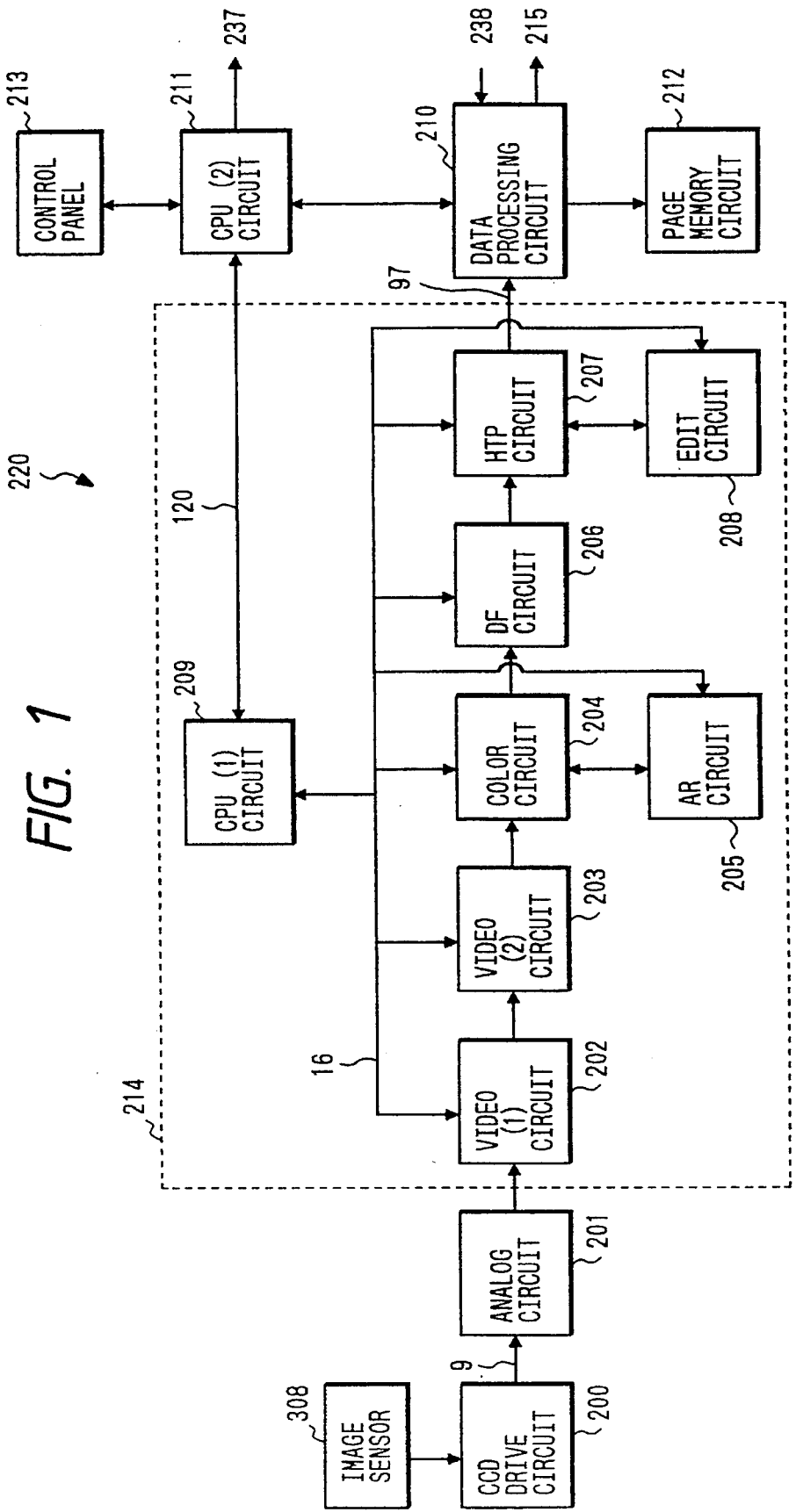
FIG. 1 is a block diagram showing the arrangement of an image scanner section of a digital copying machine according to an embodiment of the present invention.

FIG. 1 is a block diagram showing the arrangement of the image scanner section. The image scanner section designated by reference numeral 220 in the figure includes an image sensor 308 using a charge coupled device (CCD). The image sensor 308 is mounted on a CCD drive circuit 200. The CCD drive circuit 200 is followed by an analog circuit 201, a video (1) circuit 202, a video (2) circuit 203, a color circuit 204, a digital filter circuit (DF circuit) 206, and a half tone processing circuit (HTP circuit) 207. The color circuit 204 is connected to an area recognition circuit (AR circuit) 205. An edit circuit (EDIT circuit) 208 is connected to the HTP circuit 207. The video (1) circuit 202 to HTP circuit 207, the AR circuit 205, and the EDIT circuit 208, and a central processing circuit (called CPU hereinafter) (1) 209 for controlling those circuits are interconnected by a VME bus 16 as one of the system buses specified by the system bus standards. The circuits 202 to 209 make up an image processing unit 214.

A data processing circuit 210 follows the HTP circuit 207. A CPU (2) 211 and a page memory circuit 212 are connected to the data processing circuit 210. The CPU (2) 211 is connected to a control panel 213. The data processing circuit 210 outputs image data 215 to the print section 221, which will be described later with reference to FIG. 2, and receives a control signal 238 from the print section 221. The CPU (2) 211 is connected through a control data line 120 to the CPU (1) circuit 209, and through a control data line 237 to a control device 236 of the print section 221.

Figure 2:
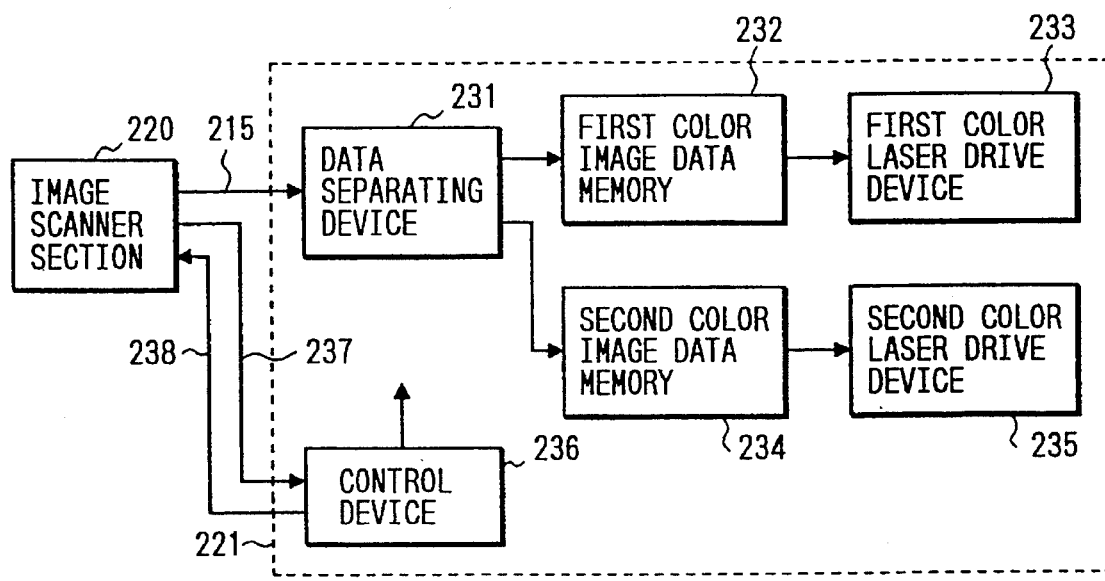
FIG. 2 is a block diagram showing an arrangement of the print section in the digital copying machine shown in FIG. 1.

FIG. 2 is a block diagram showing the arrangement of the print section 221. The print section 221, when it is of the two-color print, is made up of a data separating device 231 which receives the image data 215 from the image scanner section 220, a first color image data memory 232 and a second color image data memory 234, which are connected to the output of the data separating device 231, a first color laser drive device 233 coupled with the output of the first color image data memory 232, a second color laser drive device 235 coupled with the output of the second color image data memory 234, and the control device 236 for controlling those device. The control device 236 is connected to the CPU (2) 211 in the image scanner section 220, by way of the control data line 237, and sends the control signal 230 to the data processing circuit 210 in the image scanner section 220.

Figure 3:
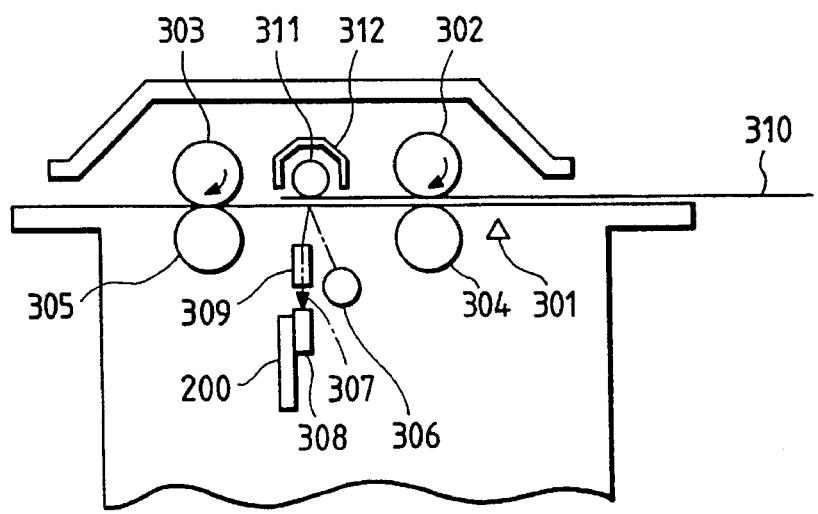
FIG. 3 is a view schematically showing in cross section a part of the image scanner section.

FIG. 3 is a view schematically showing in cross section a part of the image scanner section 220.

As shown, the image scanner section 220 includes a pair of document feed rollers 302 and 304 and another pair of document feed rollers 303 and 305. These feed roller pairs nip an original document and feed it forward. A platen glass, not shown, lies under the document transport path. A platen roller 311 is located on the platen glass. Disposed below the platen glass are a light source 306, the image sensor 308 mounted on the CCD drive circuit 200, and a convergent type rod lens array 309 for forming an image on an original document 310, that is illuminated by the light source 306, on the image sensor 308. A sensor 301 for sensing the original document 310 is located at a document inserting portion. A reference plate 312 having a plurality of planar faces, which surrounds the platen roller 311, is rotatable about the center shaft of the platen roller 311. The reference plate 312 includes a black face providing a reference in black levels and a white face providing a reference in white levels. Those faces are selectively placed between the platen glass and the platen roller 311.

The CPU (1) circuit 209 shown in FIG. 1 includes a CPU, a read only memory (ROM), a random access memory (RAM), and the like, and controls the circuits in the image processing unit 214 and communicates with the CPU (2) 211.

in FIG. 1, when a user designates a desired number of copies, and desired image processings and edits on the control panel 213, the CPU of the CPU (2) 211 sends data of the image processings and edits that are designated on the control panel 213 to the CPU of the CPU (1) circuit 209, by way of the control data line 120. The CPU on the CPU (2) 211 sends data on the paper size and the like that are selected on the control panel 213 to the control device 236 of the print section 221, by way of the control data line 237.

The image processing/edit data coming in through the control data line 120 are decoded by the CPU of the CPU (1) circuit 209. The CPU stores various parameters (control data) corresponding to the image processing/edit data through the VME bus 16 into related registers and RAMs in the circuits 202 to 208 of the image processing unit 214.

In FIG. 3, when an original document 310 is inserted into the image scanner section 220, the sensor 301 is turned on. The CPU of the CPU (1) circuit 209 detects the on-state of the sensor, and drives a document feed motor, not shown, so that the original document 310 is fed forward by the feed roller pairs 302 and 304, and 303 and 305. When the original document 310 reaches the platen roller 311, light 307 that is emitted from the light source 306 and reflected by the original document 310 hits the image sensor 308. The image sensor 308 which driven by the CCD drive circuit 200, reads an image on the original document and produces CCD video signals 9, which are then processed by the analog circuit 201 sequentially.

The analog circuit 201 extracts valid image signals from the CCD video signal 9 output from the CCD drive circuit 200. Those extracted image signals are subjected to various signal processings, such as automatic gain control, removal of the output variation by the dark current of the image sensor 308, automatic offset control, and analog to digital (A/D) conversion. The A/D converted image data are transmitted to the video (1) circuit 202.

The video (1) circuit 202 processes the image data from the analog circuit 201 in several ways. The image data are first processed for the CCD gap correction. In the CCD gap correction, the data read by the image sensor 308, which is constructed with a plurality of chips, are converted into the data obtained when the same line on the original document is read. The next processing is to separate a serial data train of red (R), green (G) and blue (B) into R, G and B pixel data, and rearrange those data into R, G and B data trains. Those separated pixel data of R, G and B are then subjected to the dark shading correction. The resultant signals are sent to the video (2) circuit 203. The dark shading correction is a subtraction process in which the image data obtained by reading the black face of the reference plate 312 are stored every pixel into the memory, and the stored black face read data are subtracted from the pixel image data obtained by actually reading an image on an original document.

The video (2) circuit 203 receives the image data from the video (1) circuit 202, and processes the image data for a bright shading correction. In the process of the bright shading correction, the image data obtained by reading the white face of the reference plate 312 are stored every pixel into a memory. The image data of pixels obtained when an image on an original document is actually read are normalized (divided) by the stored white-face read image data of pixels. The image data after the bright shading corrected are processed for an RGB position-difference correction. In the image sensor 308 used in this embodiment, R, G and B pixels are arrayed to have different positions. Actual read positions of R, G and B are different from each other. An error is inevitably caused in determining colors by the color circuit 204 located in the subsequent stage. In the process of the RGB position-difference correction, correction is made such that R, G and B pixels are read out of a virtual point. In this embodiment, three image sensors 308 located at different positions are used for reading an image on a wide original document. The error caused by the different positions of these image sensors must be removed. To this end, a process of sensor position-difference correction is performed. The corrected output image data are divided into a plurality of blocks in the main-scan direction. Then, the image data are transferred every block to the color circuit 204 sequentially.

Figure 4:
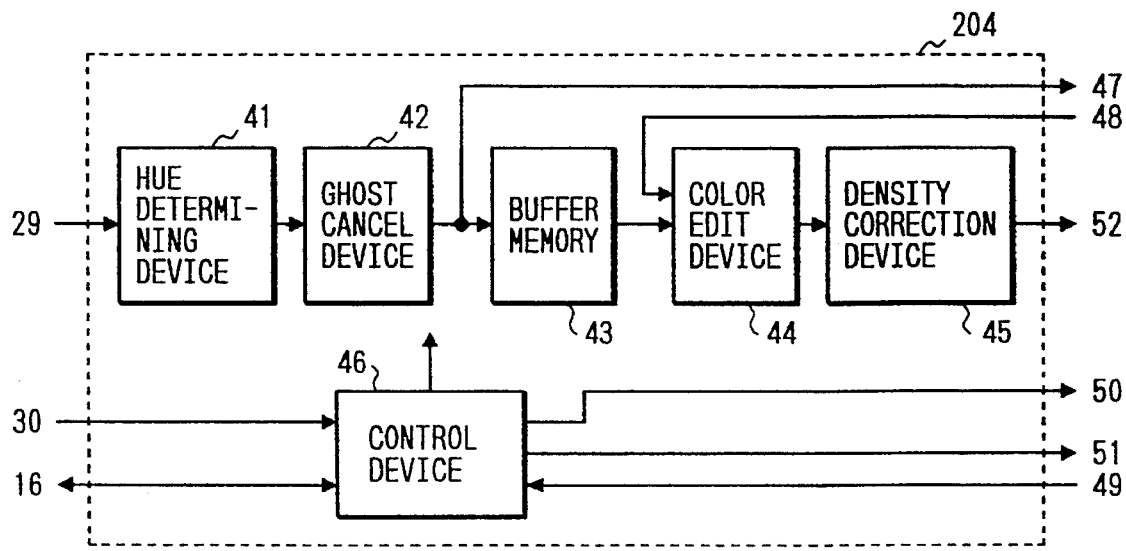
FIG. 4 is a block diagram showing a color circuit in the image scanner section shown in FIG. 1.

FIG. 4 is a block diagram showing the color circuit 204. As shown, the color circuit 204 is made up of a hue determining device 41 for receiving image data 29 from the video (2) circuit 203, a ghost cancel device 42 following the hue determining device 41, a buffer memory 43, a color edit device 44 and a density correction device 45, and a control device 46 for controlling these devices and memory. The control device 46, coupled with the VME bus 16, receives a control signal 30 from the video (2) circuit 203 and a control signal 49 from the AR circuit 205, and sends control signals 50 and 51 to the DF circuit 206 and the AR circuit 205. The image data 29 input to the color circuit 204 consists of color image signals of R, G and B. Upon receipt of the image data 29, the hue determining device 41 determines colors of the original document, and encodes the determined colors to generate color code signals, and density data.

Figure 5:
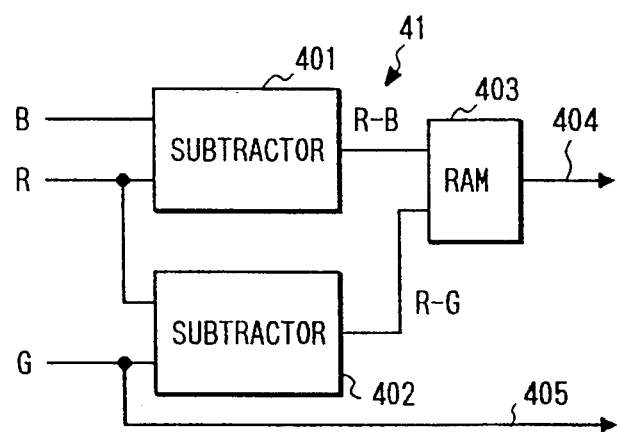
FIG. 5 is a block diagram showing a hue determining device in the color circuit shown in FIG. 4.

FIG. 5 is a block diagram showing the hue determining device 41. The hue determining device 41 is made up of a subtractor 401 for subtracting B data from R data, another subtractor 402 for subtracting G data from R data, and a RAM. 403 in the form of a look up table (LUT). The RAM 403 is addressed by R-B and R-G data from the subtractors 401 and 402, and produces color code signals. More specifically, in the hue determining device 41, the subtractors 401 and 402 produce the R-B and R-G data. The RAM 403 produces color code signals based on the combinations of hue (H) and chroma (C) that are obtained by the following equations defined by the R-B and R-G data. The G data, when received by hue determining device 41, are output as intact in the form of density data 405.

$$H = \tan^{-1}((R-G)/(R-B))$$

$$C = \sqrt{(R-B)^2 + (R-G)^2}$$

The color codes can be changed by reprogramming the data contained in the RAM 403. Various colors can be used for the marker since a range of colors that can be read can be varied by altering the hue and chroma combinations, which are used for producing color codes in the RAM 403. The data contained in the RAM 403 can be reprogrammed through the CPU (2) 211 and the CPU (1) circuit 209, from the control panel 213 in FIG. 1. The range of colors to be read as the marker colors are adjusted through the reprogramming operation.

The ghost cancel device 42 located in the subsequent stage of the hue determining device 41 corrects the color code signals that are generated by the hue determining device 41. Although the RGB position-difference correction is performed for the image data in the video (2) circuit 203, a complete correction cannot be performed. Particularly, the hue determination is erroneously performed on the edge portions of the black image. In this case, color codes other than achromatic color are generated. The ghost cancel device 42 removes these erroneous color codes (called a ghost).

Figure 6:
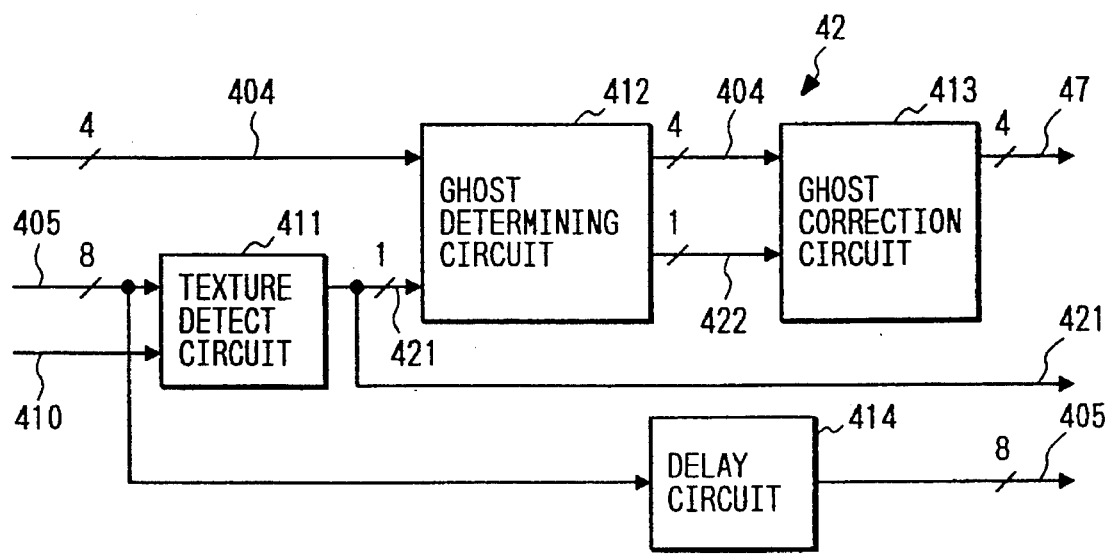
FIG. 6 is a block diagram showing an arrangement of a ghost cancel device in the color circuit shown in FIG. 4.

FIG. 6 is a block diagram showing an arrangement of the ghost cancel device 42. The ghost cancel device 42 is made up of a texture detect circuit 411, a ghost determining circuit 412, a ghost correction circuit 413, and a delay circuit 414. The texture detect circuit 411 compares density data 405 consisting of 8 bits, for example, with a texture reference level 410, to produce a texture flag 421 of 1 bit, which indicates whether or not a density level of an aimed pixel is lower than the texture level. The ghost determining circuit 412 retains the color code 404 of 4 bits, for example, and the texture flag 421 from the texture detect circuit 411. In this case, the color code and the flag of a preset number (e.g., 5) of pixels are retained in this circuit. The ghost determining circuit 412 compares the data pattern of five pixels with predetermined ghost patterns, and produces a ghost flag 422 of 1 bit, which indicates whether or not an aimed pixel represents a ghost generating pixel, and a color code 404. The ghost correction circuit 413 receives the ghost flag 422 and the color code 404 from the ghost determining circuit 412, and produces a corrected color code 47. The delay circuit 414 delays the density data 405 by a preset time, and produces the delayed density data.

Figure 7:
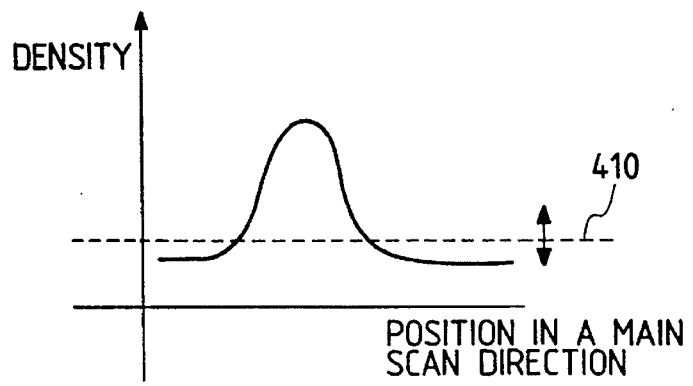
FIG. 7 is a graph showing the principle of the texture detect circuit in the ghost cancel device shown in FIG. 6.

The ghost cancel device 42 replaces color pixels sandwiched by black and white pixels with white or black pixels for the ghost correction. The hue determining device 41 treats black and white as the same achromatic color, and assigns a color code 404 to the black and white. The black or white of the achromatic color depends on a gray level. Determination as to whether the achromatic color is black or white is made by the texture detect circuit 411. As shown in FIG. 7, when the density data 405 are higher than the texture reference level 410, the texture detect circuit 411 determines the achromatic color to be black and sets the texture flag 421 to "0". When the density data 405 are lower than the texture reference level 410, it determines the achromatic color to be white and sets the flag to "1".

Many types of papers, such as normal paper, tracing paper, and news paper, are used for the original document. These papers have densities proper to them, respectively. For this reason, if it is prescribed that density levels lower than a specific density level belong to white, some types of document papers suffer from poor image reproduction. If the white is defined by the density levels equal to or lower than the density level of the normal paper, the news paper as a document is determined to be entirely black. If the white is defined by those levels equal to or lower than the density level of the news paper, part of the image on the normal paper is determined to be white. The result is failure of correcting the color ghost generated on the document. Proper alteration of the texture reference level 410 as the reference in determining the texture portion (white) provides a proper texture detection irrespective of the types of documents. The texture reference level 410 can be altered through the CPU (2) 211 and the CPU (1) circuit 209, from the control panel 213 in FIG. 1.

The combination of the color code 404 and the texture flag 421 are capable of discriminately defining black, white, and chromatic colors. The ghost determining circuit 412 sets the ghost flag 422 to "1" when the color pattern of a total of five pixels, which consist of the aimed pixels and each of two pixels sandwiching the aimed pixel in front and behind, is coincident with one of the ghost patterns. The ghost correction circuit 413 sets all the color codes of the aimed pixels to "1" when the ghost flag 422 is "1", and outputs them as the color codes 47 after corrected. In other case, it straightforwardly outputs the received color code 404 as the color codes 47 after corrected. The delay circuit 414 delays the density data 405 by a time taken for the ghost correction.

The density data and the color codes thus generated are sequentially loaded into the buffer memory 43. The corrected color code 47 and the texture flag are transferred to the AR circuit 205. In the present embodiment, a partial image area enclosed by a mark can be variously edited in real time. The mark is drawn on the original document, with a marker pen. The AR circuit 205 is provided for detecting the partial image area enclosed by the marker.

Figure 8:
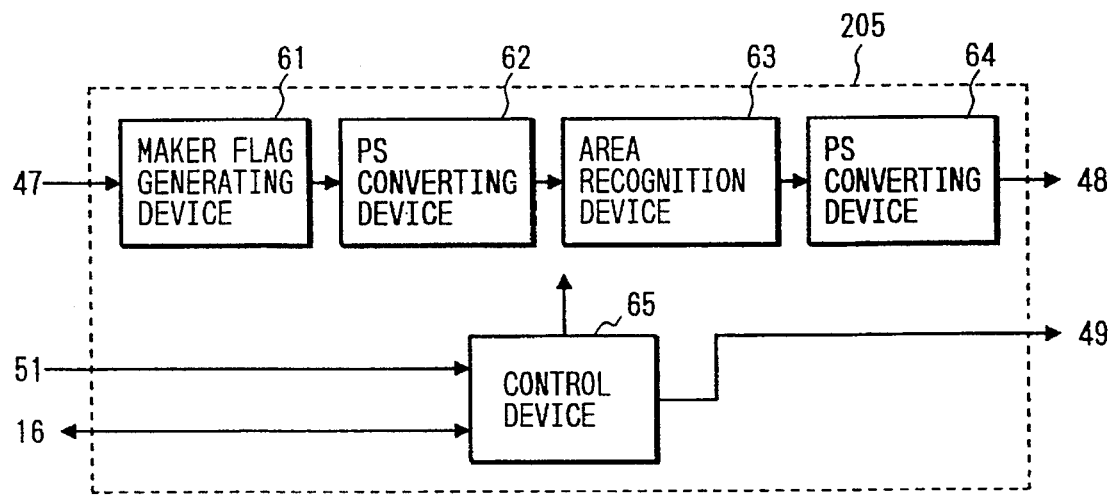
FIG. 8 is a block diagram showing an AR (area recognition) circuit 205 in the circuit of FIG. 1.

FIG. 8 is a block diagram showing the AR circuit 205. The AR circuit 205 is made up of a marker flag generating device 61 for receiving the color code 47 from the color circuit 204, a parallel-to-serial (PS) converting device 62 connected to the output of the marker flag generating device 61, an area recognition device 63, a serial-to-parallel (SP) converting device 64, and a control device 65 for controlling those devices 61 to 64. The control device 65, coupled with the VME bus 16, receives a control signal 51 from the color circuit 204, and sends a control signal 49 to the color circuit 204.

The corrected color code 47 received from the color circuit 204 consists of the signals of the respective blocks. The marker flag generating device 61 determines as to whether it is the marker image using the color code. If it is the marker image, a marker flag is generated. The marker flag block-processed is transformed into the signals of one line by the serial-to-parallel converting device 62. The image area enclosed by the marker is recognized from the one-line marker flag thus obtained. This is performed by the area recognition device 63. The device 63 generates an area flag indicating "within the area". The generated area flag is divided into signals of the respective blocks again by the SP converting device 64. These divided signals are output, in the form of an area signal 48, to the color edit device 44 of the color circuit 204. The reason why the buffer memory 43 is provided in the color circuit 204 is that the color data and the density data are stored during the recognizing time because a long time is taken for the AR circuit 205 to recognize the area, whereby they are timed with the area signal 48 from the AR circuit 205.

The arrangements and the operations of the respective portions of the AR circuit 205 will be described in detail after description of the overall of the digital copying machine is given.

The block divided, area signal 48 out from the AR circuit 205 is input to the color edit device 44 of the color circuit 204 shown in FIG. 4, and the control signal 49 is input to the control device 46. The control device 46 reads the density data and the color code of the corresponding pixels from the buffer memory 43, in synchronism with the area signal 48, and transfers them to the color edit device 44. The copying machine of this embodiment is capable of print the image in a multiple of colors, for example, two colors. In the machine, a subcolor flag is used for designating a desired color in the image on the original document and for selecting one of the two colors for the designated, desired color when it is printed out. A drop color flag is used for designating an image of an aimed color on the original document in order to erase the image. Since with this function, the marker, for example, is unnecessary, it is erased tacitly. These functions may be applied only to the area within or outside the area designated by the marker. Using a BKG enable flag, it is possible to designate the image area to which a process of the texture removal to be performed in the next stage is to be applied, viz., the areal portion within or outside the designated area. Those flags are generated by the color edit device 44.

The thus generated flags, density data and color codes are successively transferred to the density correction device 45. The density correction device 45 is provided for setting the density data of the pixel having the drop color flag being set to white (erasing) and for allowing the densities of the colors (color codes) to be adjusted independently. The output signals 52, such as the thus processed subcolor flag, BKG enable flag, area signal, and density data, are transferred to the DF circuit 206 successively.

In the DF circuit 206, the output signals of the color circuit 204 are operated in the following processes, and then the processed signals are output to the HTP circuit 207. The processes performed in the DF circuit 206 are: a process to set the texture portion on the original document having the BKG enable flag being set to white, processes of edge emphasis and smoothing in accordance with an image mode selected by the digital filter, and a process in which when the texture density in the image edge portion is increased by the smoothing process, the subcolor flag of the texture pixels having the increased texture density is set to be equal to that of the image portion.

The HTP circuit 207 executes many processes, such as a process to convert block-basis image data trains into line-basis image data trains that can be processed in parallel, enlargement process, density adjustment, and half-tone process for converting image data into multi-level data of area gradation. The multi-level data 97 are output to the data processing circuit 210.

The EDIT circuit 208 executes the following processes. A rectangular area recognition process is first executed on the basis of the line-basis data output from the HTP circuit 207. In this embodiment, as recalled, a desired image area is specified by enclosing the image area by a marker. Further, a rectangular area can be specified by a dot drawn on an original document with a marker or a dot designated through the control panel 213. The rectangular area recognition process is to recognize the rectangular area and to generate area flags corresponding to the pixels within the rectangular area. The area flag generated in this process is sent to the HTP circuit 207. In the circuit, the area flag, together with the texture flag, subcolor flag, and density data, is used for an enlargement/reduction process. The image data operated in the enlargement/reduction process are transferred to the EDIT circuit 208 which in turn processes the image data for mirror edit, negative/positive edit, density adjustment and mesh edit. The mirror edit is for obtaining a mirror image. The negative/positive edit is for obtaining a negative/positive inversion image, i.e., a white/black inversion image. The mesh edit to enmesh the image with a mesh pattern selected from the control panel 213, to mask the areal portion within the area, or trim the portion outside the area. The mirror edit, negative/positive edit, and mesh edit may be applied to a specific area or the entire area of the image. The processed image data are thus sent to the HTP circuit where it is subjected to the density adjustment, half-tone processing, and the process for converting the data into 4-level data.

In FIG. 1, the data processing circuit 210 sends the image data received from the HTP circuit 207 to the page memory circuit 212. The image data are stored into the page memory in the page memory circuit 212. After the read operation is completed for the image on the original document, the CPU of the CPU (1) circuit 209 sends data through the control data line 120 to the CPU in the CPU (2) 211. Then, the CPU in the CPU (2) 211 sends signals indicative of the transport of paper and storage of the image data in the page memory to the control device 236 in the print section 221, by way of the control data line 237.

In FIG. 2, the control device 236 in the print section 221 transports a given paper, and at the same time sends a control signal 238 to the data processing circuit 210, thereby to read the image data 215 from the page memory in the data processing circuit 210 at predetermined timings. The image data 215 thus read out are sent to the data separating device 231. The data separating device 231 has the function to portion out the density data to different destinations by using the subcolor flag. When the subcolor flag is "0", the density data are sent to the first color image data memory 232, and the white data are transferred to the second color image data memory 234. When the subcolor flag is "1", the density data are transferred to the second color image data memory 234, and the white data are transferred to the first color image data memory 232. The print section 221 based on the xerography technique includes a charge corotron, and developing units for first and second colors. The print section 221 transfers and fixes two color images on a photoreceptor (drum) on a paper simultaneously. Exposure semiconductor lasers for first and second colors are provided, and driven and controlled according to the image data by the first color laser drive device 233 and the second color laser drive device 235.

Figure 9:
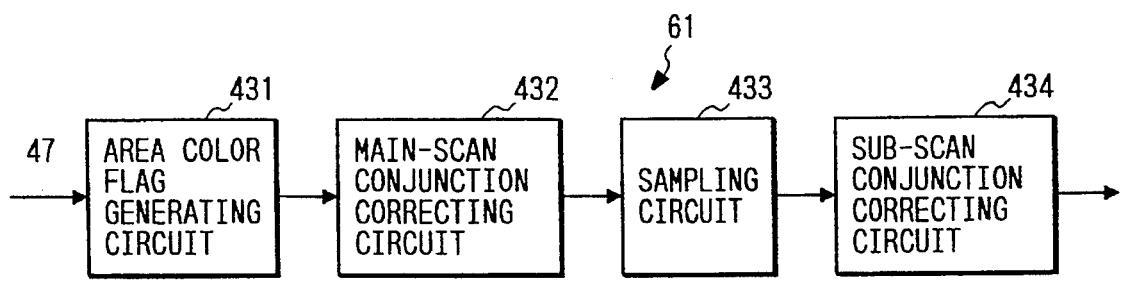
FIG. 9 is a block diagram showing a marker flag generating device in the AR circuit shown in FIG. 8.

FIG. 9 is a block diagram showing the marker flag generating device 61. The marker flag generating device 61 is made up of an area color flag generating circuit 431, a main-scan conjunction correcting circuit 432, a sampling circuit 433, and a sub-scan conjunction correcting circuit 434. The area color flag generating circuit 431 receives the corrected color code 47, and detects a pixel as an area designating marker color and generates an area color flag. The main-scan conjunction correcting circuit 432, coupled with the output of the area color flag generating circuit 431, corrects the marker portion in the main-scan direction. The sampling circuit 433, connected to the output of the main-scan conjunction correcting circuit 432, samples the image data at intervals of a preset number of pixels in the main-scan and sub-scan directions in order to maintain a high speed processing. The sub-scan conjunction correcting circuit 434, connected to the output of the sampling circuit 433, corrects the marker portion in the sub-scan direction.

Figure 10:
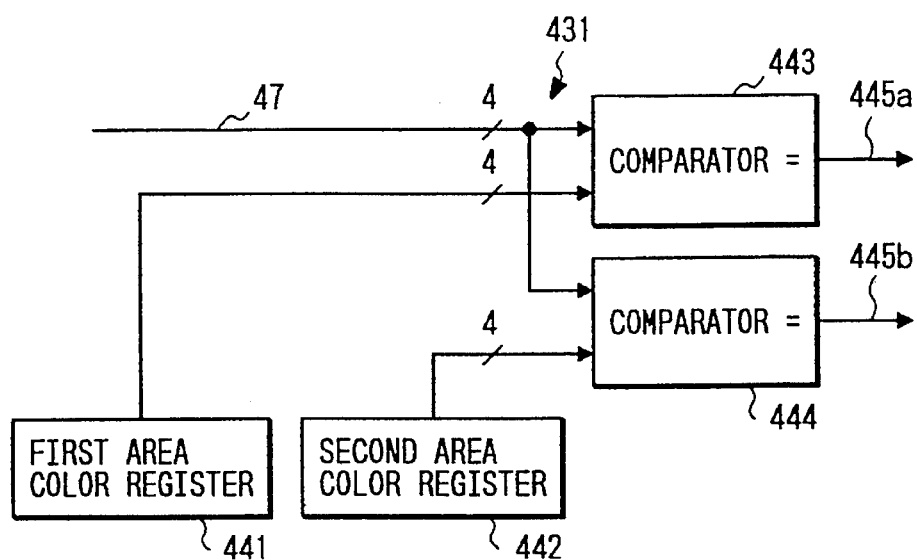
FIG. 10 is a block diagram showing an area color flag generating circuit in the marker flag generating device shown in FIG. 9.

FIG. 10 is a block diagram showing an arrangement of the area color flag generating circuit 431 when two types of area designating markers are used concurrently. The area color flag generating circuit 431 is comprised of a first area color register 441 for retaining a color code of the first area color, a second area color register 442 for retaining a color code of a second area color, a comparator 443, and another comparator 444. The comparator 443 compares the color code of the first area color from the first area color register 441 with the color code 47 of the second area color from the ghost cancel device 42. When both the color codes are coincident with each other, the comparator 443 produces a first area color flag 445a of "1". When those color codes are not coincident, it produces the flag 445a of "0". The comparator 444 compares the color code of the second area color from the second area color register 442 with the corrected color code 47. When both the color codes are coincident, the color edit device 44 produces a second area color flag 445b of "1". When those color codes are not coincident, produces the color flag 445b of "0". Thus, the area color flag generating circuit 431 checks as to whether or not the color codes of the first and second area colors are coincident with the color code 47 every pixel by the comparators 443 and 444, and assigns the area color flag of "1" to the pixel of the color codes coincidence.

It is difficult to write a marker on an original document without color irregular and blur. Particularly, the fluorescent marker is likely to be broken because of its low density. Frequently, it is broken over several pixels. In this case, there is a fear that the area designated by the marker is mistakenly determined. To eliminate the mistaken determination of the area, the broken marker is corrected before a marker flag of each pixel is determined. It is the main-scan and sub-scan conjunction correcting circuits 432 and 434 that perform the conjunction correction.

Figure 11:
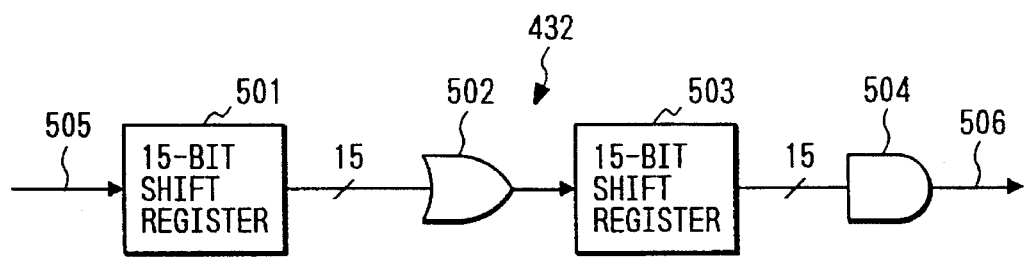
FIG. 11 is a block diagram showing an arrangement of a main-scan marker correcting circuit in the marker flag generating device shown in FIG. 9.

FIG. 11 is a block diagram showing an arrangement of the main-scan conjunction correcting circuit 432. The main-scan conjunction correcting circuit 432 is comprised of a 15-bit shift register 501, an OR circuit 502, a 15-bit shift register 503, and an AND circuit 504. The 15-bit shift register 501 sequentially receives area color flags 505 (represents both the first and second area color flags 445a and 445b) and retains the flags of 15 pixels. The OR circuit 502 ORs the area color flags 505 of 15 pixels. The 15-bit shift register 503 sequentially receives the output data of the OR circuit 502 and retains the data of 15 pixels. The AND circuit 504 ANDs the 15-pixel data from the 15-bit shift register 503.

Figure 12:
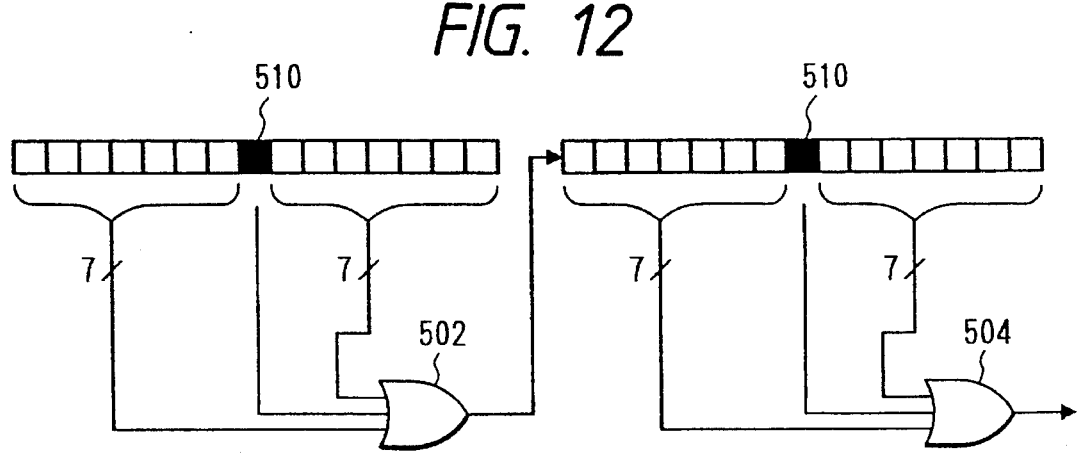
FIG. 12 is an explanatory diagram showing the operation of the main-scan marker correcting circuit shown in FIG. 11.

The operation of the main-scan conjunction correcting circuit 432 will be described with reference to FIGS. 12(a)–13(c). As shown in FIG. 12, the 15-bit shift register 501 sequentially receives area color flags 505 and retains the area color flag of a total of 15 pixels, an aimed pixel 510, seven pixels before the aimed pixel and seven pixels after the aimed pixel. Then, the OR circuit 502 ORs the area color flags of the 15 number of pixels (this process will be referred to as an OR process). This OR process implies that if the pixels of the designated marker color, even one pixel, are contained in the 15 pixels, the aimed pixel 510 is deemed as the pixel of the marker color, and the area color flag is set to "1". When input image as shown in FIG. 13(a) in which no pixel of the marker color is present between pixels 511 and 512 of the marker colors, that is, it is broken off therebetween (marker is broken off therebetween), is OR processed, 7 pixels are located on both sides of each of the pixels 511 and 512, as shown in FIG. 13(b). As a result, the broken portions are filled with the area color flags. In the figure, pixels designated by reference numeral 513 are those deemed as the pixels of the marker color.

As shown in FIG. 12, the area color flags after OR processed are sequentially input to the 15-bit shift register 503, and the area color flags of a total of 15 pixels, the aimed pixel 510 and 7 pixels before the aimed pixel and 7 pixels after it, are retained in the same. Then, the AND circuit 504 ANDs the area color flags of 15 pixels (this process will be called an AND process). The AND process implies that in a case where the area color flags of 15 pixels are all "1", the area color flag of the aimed pixel 510 is set to "1", and in other cases the area color flag is set to "0". As the result of the AND process, as shown in FIG. 13(c), seven pixels of the marker color on both sides of the pixel of the marker color, that are added in the OR process are cut off, and only the pixels between the two pixels 511 and 512 of the marker color, viz., in the broken-off portion, are deemed as the pixels of the marker color. With this, a required position accuracy can be secured in the marker detection. Reference numeral 514 designates pixels that are determined as the pixels of the marker color by the AND process.

In this way, the broken-off of the maker of 14 pixels or smaller in the main-scan direction can be corrected while keeping a required position accuracy of the marker detection. Area color flags 506 after the conjunction correction are output from the AND circuit 504, and applied to the sampling circuit 433.

FIG. 14 is a block diagram showing an arrangement of the sampling circuit 433. The sampling circuit 433 comprised of a latch 522, another latch 524, an OR circuit 525, a line memory 526, and an AND circuit 529 The latch 522 samples the marker-corrected area color flags 506 by a sample clock (1) 521. The latch 524 samples the output signal by a sample clock (2) 523. The OR circuit 525 receives at one of the input terminals the output signal of the latch 524. The line memory 526 stores the output signals of the OR circuit 525 every block. The AND circuit 529 ANDs the output signal 527 of the line memory 526 and a sample control signal 528. The output signal of the AND circuit 529 is input to the second input terminal of the OR circuit 525. The sample clock (1) 521 has a frequency to sample the marker-corrected area color flags 506 every pixel. The sample clock (2) 523 has a frequency to sample the area color flags 506 at intervals of a preset number of pixels, the frequency being lower than the frequency of the sample clock (1) 521.

In the sampling circuit 433, the marker-corrected area color flags 506 are first sampled for each pixel at the frequency of the sample clock (1) 521, by the latch 522. Then, those are sampled at intervals of a preset number of pixels, e.g., 6 pixels, at the frequency of the sample clock (2) 523 by the latch 524. The thus sampled area color flags are stored every block into the line memory 526, through the OR circuit 525. The output signals or the area color flags 527 of one block are transferred from the memory to the sub-scan conjunction correcting circuit 434 and also to the AND circuit 529. When the sample control signal 528 applied to the AND circuit 529 is "1", the area color flags 527 output from the OR circuit 525 and the next area color flag are logically summed by the OR circuit 525, and the result is stored into the line memory 526. Repeating this sequence of operations, the logical sum of the area color flags of a plurality of lines are stored into the line memory 526. As a result, the sampling is carried out in the sub-scan direction. The number of lines of the area color flags to be logically summed depends on a percentage of the enlargement/reduction. This is controlled by the sample control signal 528.

FIG. 15 is a block diagram showing an arrangement of a sub-scan conjunction correcting circuit used in the marker flag generating device shown in FIG. 9. The sub-scan conjunction correcting circuit 434 is made up of an n-line memory 531 for storing the area color flags 527 of an n number of lines output from the sampling circuit 433, an OR circuit 532 for ORing the area color flags of n lines from the n-line memory 531, another n-line memory 533 for storing the data of n lines output from the OR circuit 532, and an AND gate 534 for ANDing the n-line data from the n-line memory 533. In the sub-scan conjunction correcting circuit 434, as in the main-scan conjunction correcting circuit 432, the n-line memory 531 and the OR circuit 532 cooperate for the OR process. The n-line memory 533 and the AND circuit 534 cooperate for the AND process. The execution of the OR process and the AND process results in the conjunction correction in the sub-scan direction. The output signal of the AND circuit 534 is output as a marker flag 535 to the serial-parallel converting device 62 in the next stage.

Figure 16:
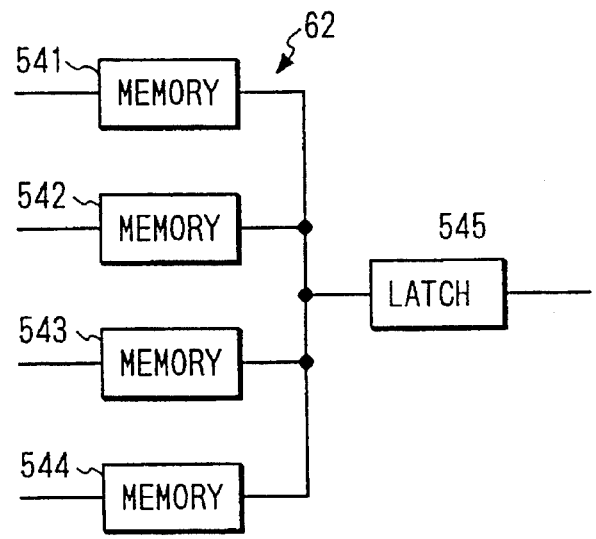
FIG. 16 is a block diagram showing a PS converting device in the AR circuit shown in FIG. 8.

FIG. 16 is a block diagram showing the PS converting device 62 in the AR circuit 205 shown in FIG. 8. In this instance, the PS converting device 62 is arranged for four blocks. As shown, the PS converting device 62 includes four memories 541 to 544 for storing the marker flags and texture flags of four blocks, and a latch 545 for temporarily storing the output data signals of these memories 541 to 544 and sequentially outputting them. In this embodiment, a plurality of image data blocks are processed in parallel for high speed data processing. To the area recognition, the parallel data blocks must be converted into serial data of one line. During the parallel data processing operation, the processings of data concurrently progress at the boundary between the adjacent data blocks. Therefore, it is impossible to simply convert the parallel data into serial data. In this embodiment, the parallel to serial data conversion is carried out after the valid pixels are sampled by the sampling circuit 433 in the marker flag generating device 61.

Figure 17:
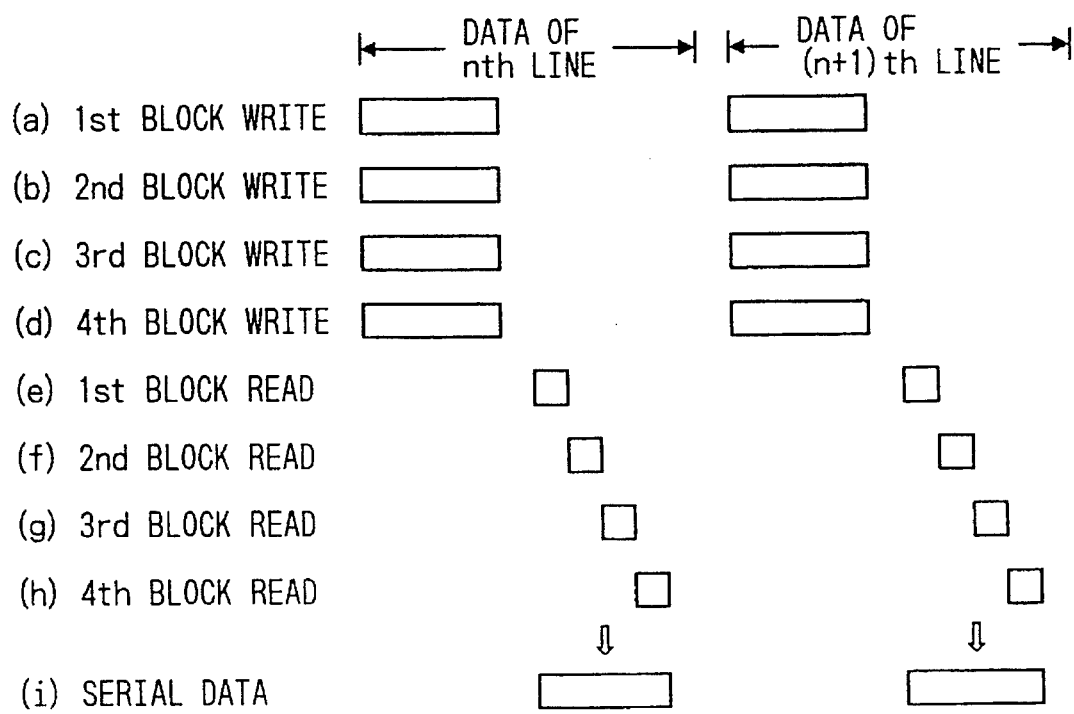
FIG. 17 is an explanatory diagram explaining the operation of the PS converting device shown in FIG. 16.

FIG. 17 is an explanatory diagram for explaining the operation of the PS converting device 62 shown in FIG. 16. In the PS converting device 62, as shown in (a) to (d) of FIG. 17, the parallel data of the n-th line are stored into the block memories 541 to 544. After completion of the writing of all the block data, the data are read out of the memories 541 to 544 in this order, as shown in (e) to (f) of FIG. 17. As a result, serial data as shown in (i) of FIG. 17 are obtained. Thereafter, the parallel data of the (n+1)th line are written into the memories 541 to 544, and read out thereof similarly. The write/read operation is repeated for the remaining lines. The same thing is correspondingly applied for other cases than the case where the number of blocks is 4.

The area recognition device 63 recognizes a closed loop of the marker using the marker flags and the texture flag, which are derived from the PS converting device 62, and generates an area flag indicative of the area specified by the closed loop.

Figure 18:
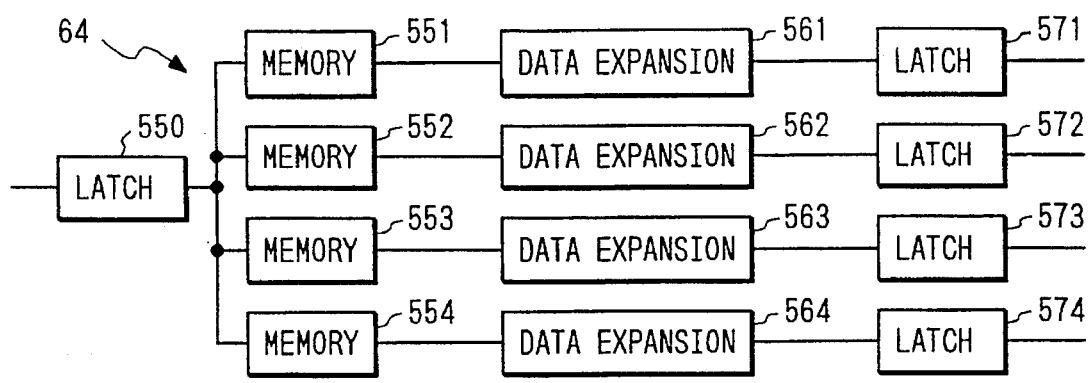
FIG. 18 is a block diagram showing an SP converting device in the AR circuit shown in FIG. 8.

FIG. 18 is a block diagram showing the SP converting device 64 in the AR circuit 205 shown in FIG. 8. The SP converting device 64 is made up of a latch 550 for temporarily storing parallel data from the area recognition device 63, four memories 551 to 554 connected to the output of the latch 550, four data expansion devices 561 to 564 connected to the outputs of the memories 551 to 554, and four latches 571 to 574 connected to the outputs of the data expansion devices 561 to 564.

Figure 19:
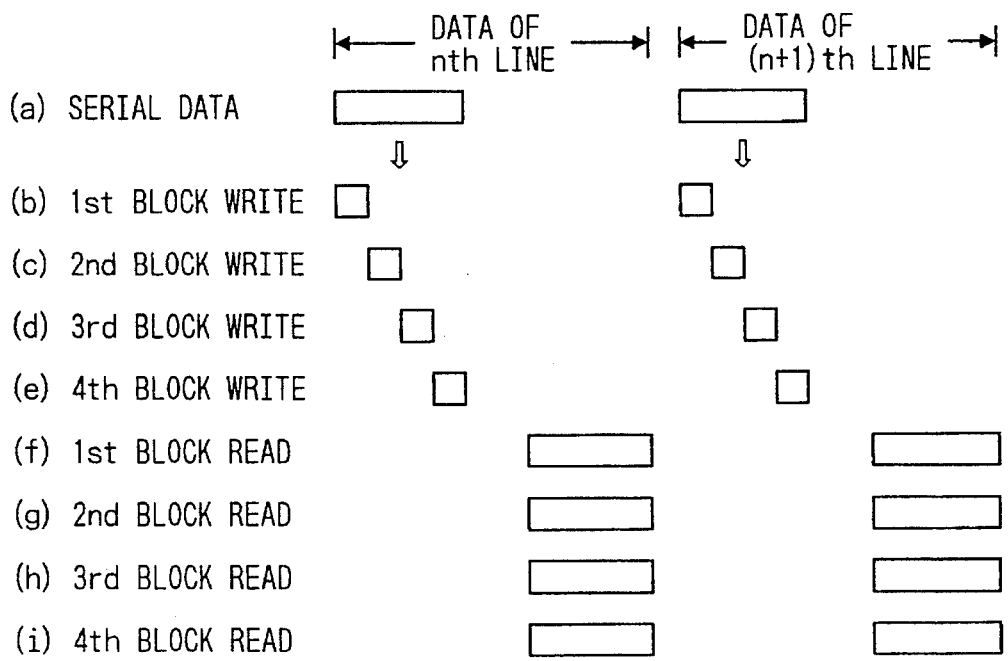
FIG. 19 is an explanatory diagram explaining the operation of the SP converting device shown in FIG. 18.

FIG. 19 is an explanatory diagram for explaining the operation of the SP converting device 64 shown in FIG. 18. In the SP converting device 64, the serial data ((a) of FIG. 19) of a preset number of pixels ((b) of FIG. 19) are first stored into the 1-block memory 551. Thereafter, storing of the serial data into the 2-block memory 552 starts as shown in (c) of FIG. 19. A similar storing operation is repeated till the 4th block data as shown in (e) of FIG. 19. Afterwards, the data thus stored are read out of the memories 551 to 554 as shown in (f) to (i) of FIG. 19. Then, the storing operation of the serial data of the (n+1)th line starts. The sequence of writing and reading operations is repeated for all the lines. The same thing is correspondingly applied for other cases than the case where the number of blocks is 4.

Figure 20:
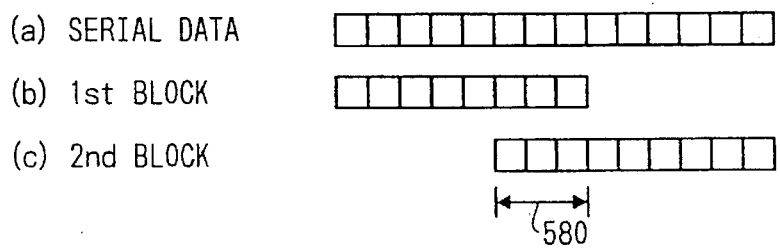
FIG. 20 is an explanatory diagram explaining the operation of storing the data in the vicinity of the boundary between the first block data and the second block data, which is carried out in the SP converting device shown in FIG. 18.

In this embodiment, the data in the vicinity of the boundary between the adjacent blocks are processed in the processings of both the blocks. For this reason, the same data are stored in the block memories of both the blocks. FIG. 20 is an explanatory diagram for explaining the operation of storing the data in the vicinity of the boundary between the first block data and the second block data, which are carried out in the SP converting device 64 shown in FIG. 18. (a) of FIG. 20 shows serial data, and (b) and (c) of FIG. 20 show the first block data to be stored and the second block data to be stored. Reference numeral 580 designates the data where the first and second block data overlap.

Figure 21:
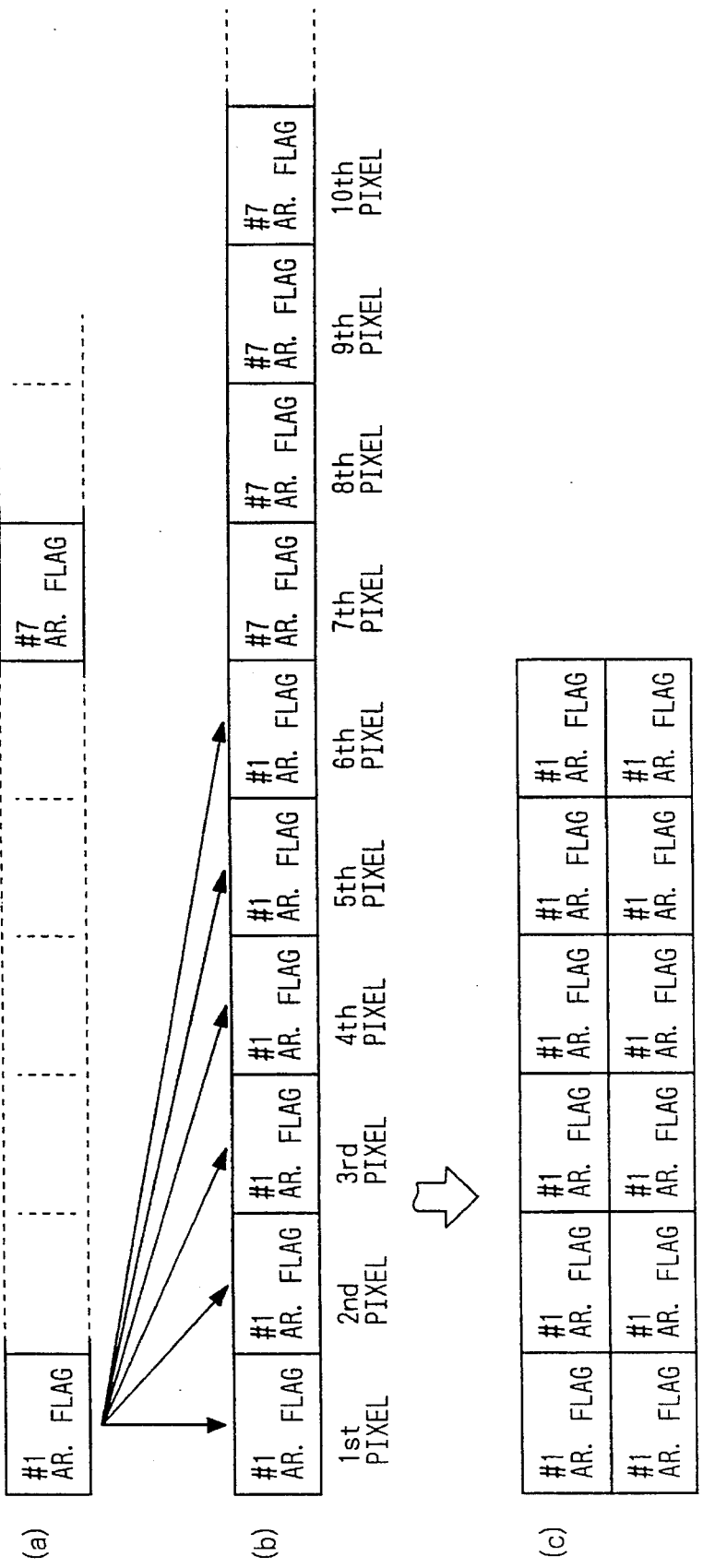
FIG. 21 is an explanatory diagram explaining the operation of the data expansion device shown in FIG. 18.

The data read out of the memories 551 to 554 are applied to the data expansion devices 561 to 564, respectively. In the data expansion devices 561 to 564, the data are expanded by the data amount corresponding to the number of pixels that are sampled by the sampling circuit 433 in the marker flag generating device 61. FIG. 21 is an explanatory diagram for explaining the operation of the data expansion device when the data are sampled every 6 pixels in the main-scan direction and every 2 pixels in the sub-scan direction. In the data expansion device, the same input data as shown in (a) of FIG. 21 (area data: denoted as AR flag in the figure) are output in a manner that the AR flags of 6 pixels are output in the main-scan direction ((b) of FIG. 21) and the AR flags of 2 pixels are output in the sub-scan direction ((c) of FIG. 21).

Through the above process, the area flags are generated in the AR circuit 205. The proper image data (color codes and density data) are retained in the buffer memory 43 of the color circuit 204 during progression of the area recognition, and are output to the color edit device 44 in synchronism with the area flag. In the process by the AR circuit 205, the data delay times differ with the percentage of enlargement/reduction. Therefore, the data are read out of the buffer memory 43 by the control signal 49 derived from the AR circuit 205. The image edit, such as color edit and negative/positive edit, is carried out using the color codes and density data read out of the buffer memory 43, and the area flags.

The area recognition device 63 in the AR circuit 205 shown in FIG. 8 will be described in detail. The area recognition device 63 is comprised of an area determining circuit and an area flag generating circuit located in the rear of the area determining circuit.

Figure 22:
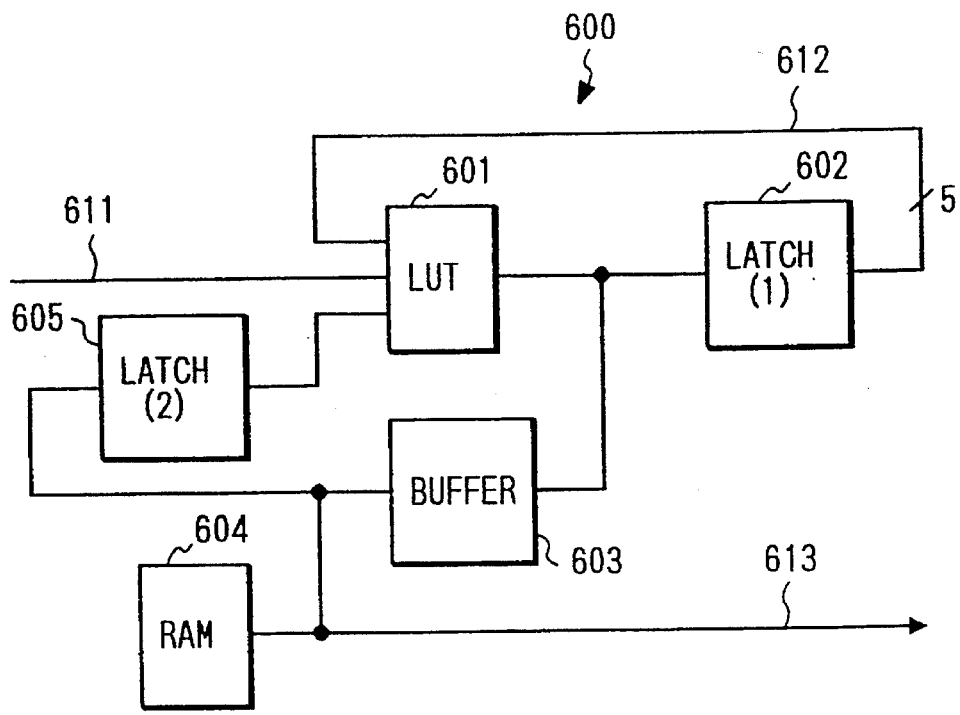
FIG. 22 is a block diagram showing an area determining circuit in the area recognition device shown in FIG. 8.

FIG. 22 is a block diagram showing an arrangement of the area determining circuit in the area recognition device. The area determining circuit, designated by reference numeral 600, is made up of an LUT 601 addressed by the output signal 611 (marker flag and texture flag) of the PS converting device 62, a latch (1) 602 and a buffer 603, which receive the output signal of the LUT 601, and a RAM 604 and a latch (2) 605, which are connected to the buffer 603. The output signal 612 of the latch (1) 602 and the output signal of the LUT 601 are used as address signals to the LUT 601. The RAM 604 produces a final status 613. As illustrated in FIG. 10, this embodiment employs two area color flags. Then, two area determining circuits 600 are provided for the area color flags, respectively.

Figure 23:
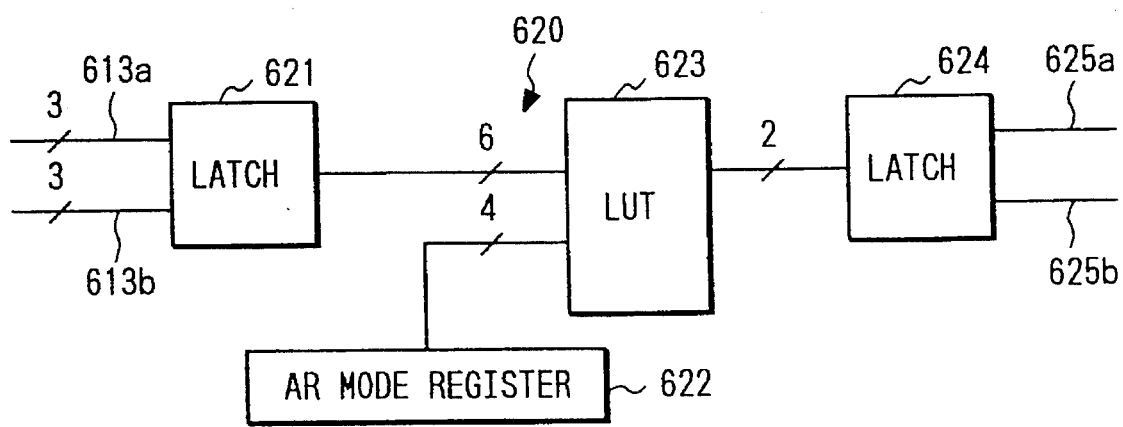
FIG. 23 is a block diagram showing an arrangement of an area flag generating circuit in the area recognition device shown in FIG. 8.

FIG. 23 is a block diagram showing an arrangement of the area flag generating circuit in the area recognition device 63 shown in FIG. 8. The area flag generating circuit, designated by reference numeral 620, is made up of a latch 621, an AR mode register 622, an LUT 623, and a latch 624. The latch 621 temporarily stores final status signals 613*a* and 613*b* output from the two area determining circuits 600, and outputs them. The AR mode register 622 outputs an AR mode data to specify one of the areas indicated by the final status signal. The LUT 623 generates an area flag when it is addressed by the final status signals 613a and 613b from the latch 621 and the AR mode data from the AR mode register 622. The latch 624 temporarily stores the output signals of the LUT 623 and outputs them as area flags 625a and 625b for each marker color.

The area determining circuit 600 determines a status of each pixel using the marker flag and the texture flag, and produces a status signal of each pixel and a history signal of each pixel. The status and the history signals define a status of each pixel, which is used for area determination. The status consists of status of 3 bits, a main-scan history of 1 bit, and a sub-scan history of 1 bit. Hereinafter, it will be referred to as a status (main-scan history and sub-scan history). Kinds of status are tabulated in Table 1. The status "outside (2) of the closed loop" indicates a portion crosses the marker an even number of times as seen from an upper side, and right and left sides. This portion locates, for example, within a concave portion of the closed loop having the concave portion on a lower side, or within an inner loop of a double loop. The status "outside (1) of the closed loop" indicates the portion outside a loop in other cases than the "outside (2) of the closed loop". The history indicates the number of crossings when it crosses the marker. For an even number of crossings, it is set to "1", and for an odd number of crossings, it is set to "0". If it is within a closed loop enclosed by the marker, the main-scan history and the sub-scan history are both "1".

TABLE 1

|  | Status |
|---|---|
| Outside (1) of the closed loop | O |
| Outside (2) of the closed loop | O' |
| Marker | M |
| Inside the closed loop | I |
| Indefinite | X |
| Image portion adjacent the marker (in the main-scan direction) | C |
| Image portion adjacent the marker (in the sub-scan direction) | C' |

Figure 24:
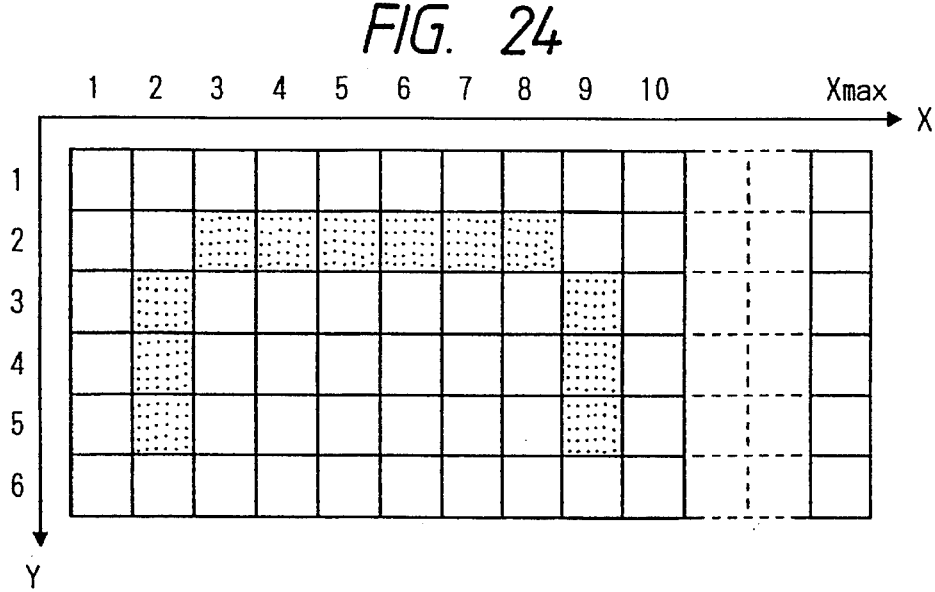
FIG. 24 is an explanatory diagram showing the coordinate system expressing pixels, which is used for the area determination.

Since this embodiment employs a line sequential process using the line image sensor, the area determination is made on the basis of three directions. The procedure for the area determination follows. As a first step, the main-scan directional determination is carried out to determine a provisional status/history on the basis of a continuity of an aimed pixel as seen from above and a continuity of the same as seen from the left side. As a second step, the final status/history of the aimed pixel is determined on the basis of a continuity of the pixel as seen from the right side, using the provisional status/history obtained by the main-scan directional determination of the first step. The area determination is made using data (marker flag and texture flag) as to whether the aimed pixel belongs to the marker portion, the image portion, or the texture portion, and the pattern of the status/history of pixels surrounding the aimed pixel. For the area determination, the pixels are expressed by the coordinate system in which the X axis represents the main-scan direction, and the Y axis, the sub-scan direction, as shown in FIG. 24. In the figure, white pixels are the pixels of other colors than the marker color. The mesh pixels are the pixels of the marker color.

The following conditions are set up for determining the area in the edge portion on the original document.

1) The main-scan directional area determination on the first line is carried out provided that the 0th line as O (0, 0) exists.

2) The main-scan directional area determination on the coordinates (1, Y) as the left end of the original document is carried out provided that the pixel of O (0, 0) lies at the coordinates (0, Y).

3) The main-scan directional area determination the coordinates (Xmax, Y) as the right end of the original document is carried out provided that the pixel of O (0, 0) lies at the coordinates (Xmax+1, Y).

The procedure for the area determination will be described with reference to FIGS. 25(a)–27.

1) Main-scan directional area determination on the first line

Figure 25A:
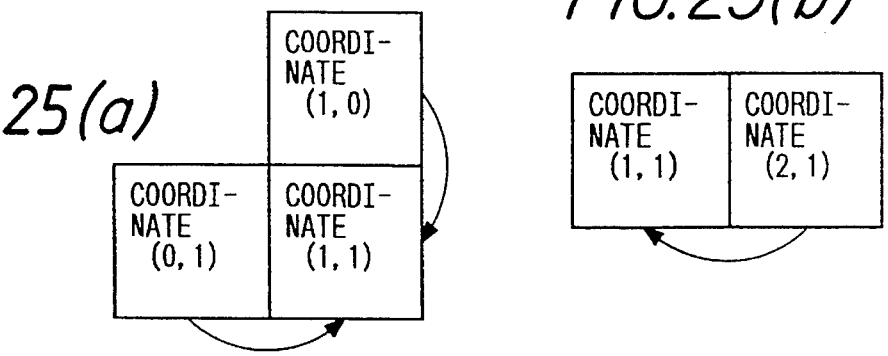
FIGS. 25(a)–25(b) are explanatory diagrams explaining the area determination on the first line.

The determination is carried out in the order of the coordinates (1, 1), (2, 1), (3, 1), . . . , (Xmax, 1). In this determination, as shown in FIG. 25(a), a provisional status/history of an aimed pixel is determined by the data of the aimed pixel, the final status/history of the 0th line, and the provisional status/history of the pixel located on the left side of the aimed pixel (referred to as the left pixel).

2) Reverse main-scan directional determination on the first line

Figure 25B:
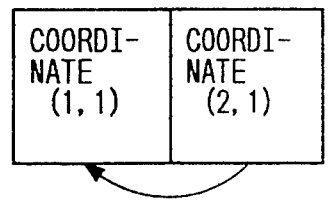
Figure 26:
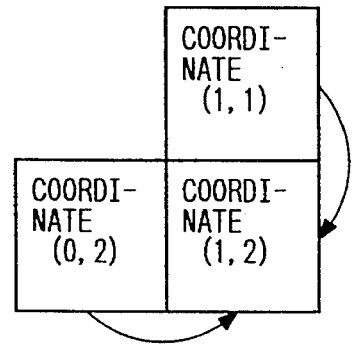
FIG. 26 is an explanatory diagram explaining the area determination on the second line.

The determination is carried out in the order of the coordinates (Xmas-1, 1), (Xmax-2, 1), (Xmax-3, 1), . . . , (1, 1). In this determination, as shown in FIG. 25(b), a provisional status/history of an aimed pixel is determined by the provisional status/history of the aimed pixel, and the final status/history of the pixel located on the right side (referred to as the right pixel).

3) Main-scan directional area determination on the second line

A provisional status/history on the second line is determined using the final status/history on the first line, that is obtained in the step 1) above. The determination is made using an aimed pixel, the final status/history of the pixel above the aimed pixel (referred to as the upper pixel), and the provisional status/history of the pixel located on the left side.

4) Reverse main-scan directional determination on the second line

The determination on the second line in the reverse main-scan is carried out as in the procedure of the step 2) above, to determine the final status/history on the second line.

5) Determination on the third and subsequent lines

Figure 27A:
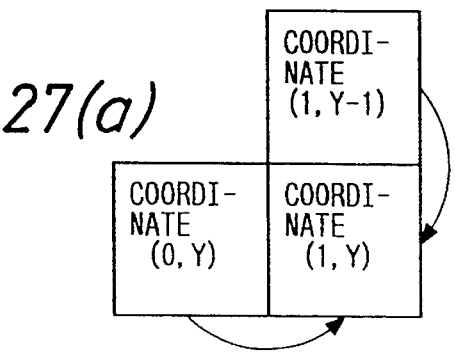
FIGS. 27(a)–27(b) are explanatory diagrams explaining the area determination on the Y-th line.
Figure 27B:
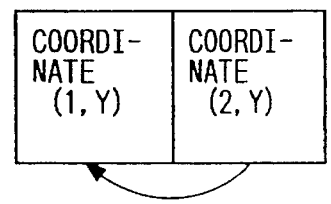

As in the determination procedure on the second line, the determination in the main-scan direction is carried out as shown in FIG. 27(a), and the determination in the reverse main-scan direction is carried out as shown in FIG. 27(b), thereby determining the final status/history of the third and subsequent lines.

The area determining circuit 600 of FIG. 22 performs the determining operation in the following procedure.

A) Determination in the main-scan direction

1. To set an address of the RAM 604.

2. To read the status/history of one pixel from the RAM 604.

3. To latch the status/history of one pixel in the latch (2), and input the marker flag of an aimed pixel and the texture flag 611 into the LUT 601.

4. To terminate the read cycle of the RAM 606 and to turn on the buffer 603.

5. To output the provisional status/history from the LUT

601. The provisional status/history of the pixel located on the left side is produced in the form of the output signal 612. The initial value of the latch (1) 602 is O (0, 0).

6. To write the provisional status/history into the color code 404.
7. To terminate the write cycle of the RAM 604, and to latch the output data of the LUT 601 in the latch (1) 602. The buffer 603 is turned off.
8. To increment the address of the RAM 604.
9. Repeat the steps 2) to 8) the number of times corresponding to the Xmax pixel.

B) Determination in the reverse main-scan direction

10. To switch the mode of the LUT 601 to the mode for the reverse main-scan directional determination.
11. To clear the contents of the latch (1) 602. The status/history is set to "0".
12. To read the provisional status/history of a right end pixel from the RAM 604.
13. To latch the provisional status/history of the right end pixel in the latch (2) 605.
14. To terminate the read cycle of the RAM 604, and turn on the buffer 603.
15. To output the status/history from the LUT 601. The status/history of the pixel on the right side is output in the form of the output signal 612 of the latch (1) 602.
16. To write the status/history to the RAM 604.
17. To terminate the write cycle of the RAM 604, and to latch the output data of the LUT 601 in the latch (1) 602. The buffer 603 is turned off.
18. To decrement the address of the RAM 604.
19. To repeat the steps of 12) to 18) the number of times corresponding to the Xmax pixel.

The final status/history determined through the above process is read out of the RAM 604 in the main-scan directional determination on the next line.

The final status/history 613 output from the area determining circuit 600 in FIG. 22 is input to the area flag generating circuit 620 in FIG. 23. In the area flag generating circuit 620, when addressed by the final status/history 613 of the aimed pixel and the AR mode data from the AR mode register 622, the LUT 623 produces an area flag. The AR mode register 622 may be placed, by the AR mode data, to three modes, 1) a mode in which only the upper portion of the marker is treated as the area inner part, 2) a mode in which only the inner part of the closed loop, exclusive of the marker, is treated as the area inner part, and 3) a mode in which the inner part of the closed loop including the marker is treated as the area inner part. The LUT 623 produces an area flag indicating as to whether or not the aimed pixel is within the area, according to the modes.

In this embodiment, the area determining circuit 600 shown in FIG. 22 detects the crossing portions where the marker crosses the image, and determines the area using the data of cross parts and the marker flag. In detecting the crossing portions, the image portion is first detected, and crossing portions are then detected from the image portion on the basis of the pixel pattern. The texture flag generated by the texture detect circuit 411 in the ghost cancel device 42 is used for the detection of the image portion. In the texture detect circuit 411, density levels lower than a preset density level are considered to indicate the pixels of the texture in the image, and the texture flag is set to "1". Therefore, the pixels where the texture flag=0 form the image portion. As already stated in connection of the ghost cancel device 42, the density of the texture is different with the types of the original document. Accordingly, if the reference of the texture (texture reference level 410) is appropriately altered, the textures of various types of the original documents can be detected.

Figure 28:
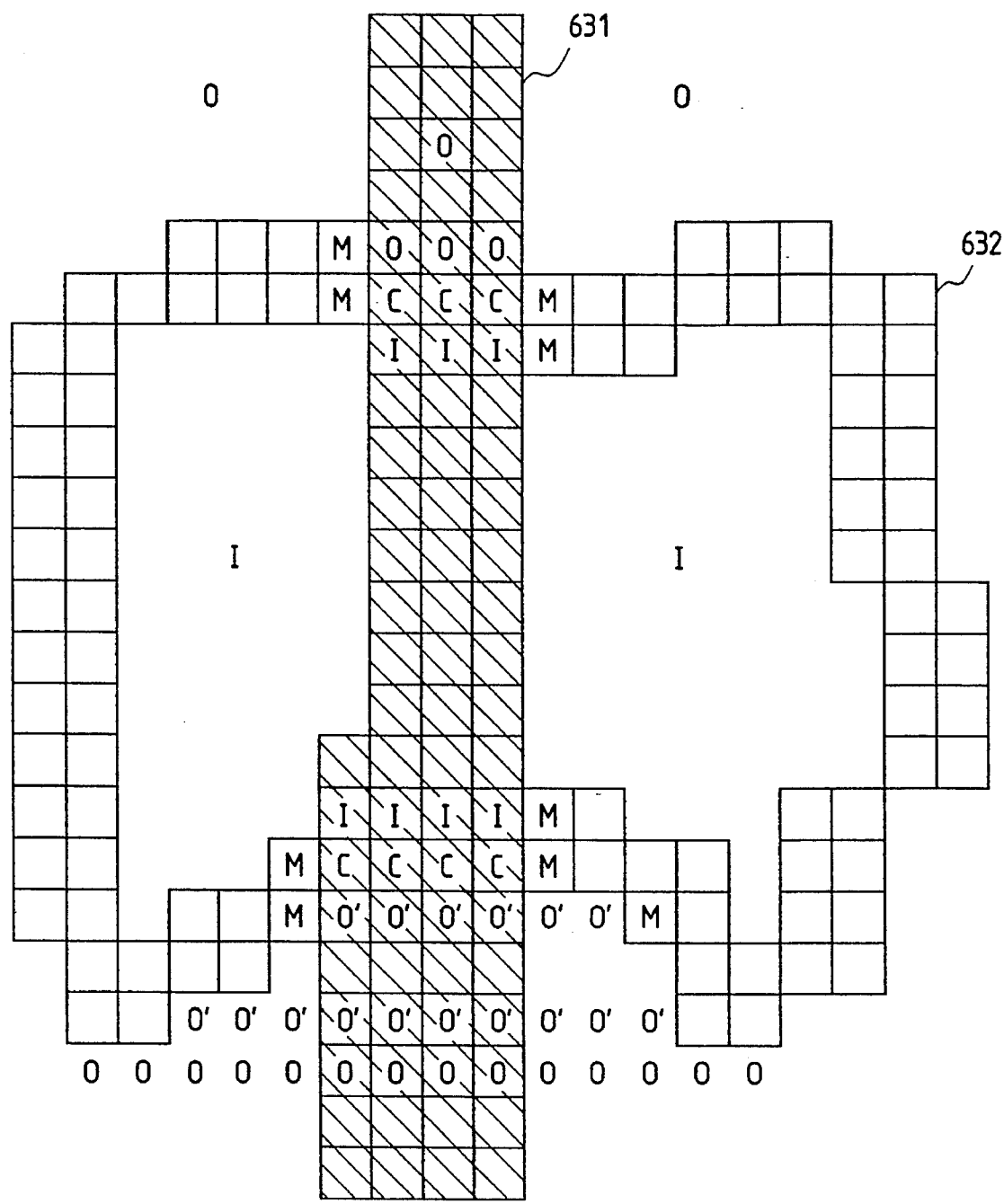
FIG. 28 is an explanatory diagram showing a pattern to be determined as crossing portions where a vertical line crosses a marker.
Figure 30A:
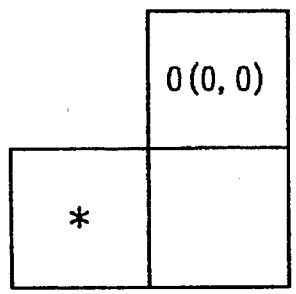
FIGS. 30(a)–30(l) are explanatory diagrams explaining the algorithm of the main-scan directional determination on the texture portion.
Figure 30B:
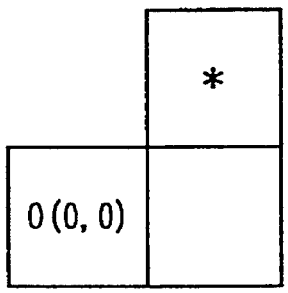
Figure 30C:
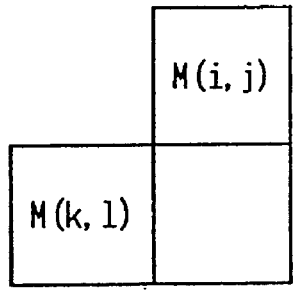
Figure 30D:
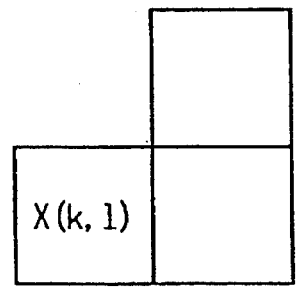
Figure 30E:
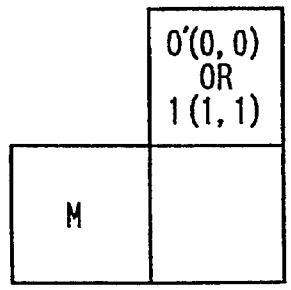
Figure 30F:
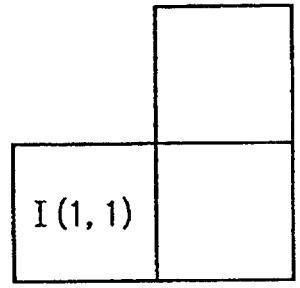
Figure 30G:
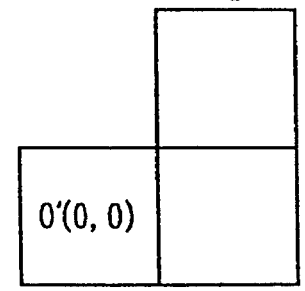
Figure 30H:
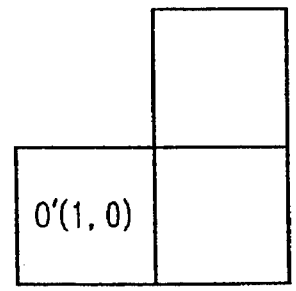
Figure 30I:
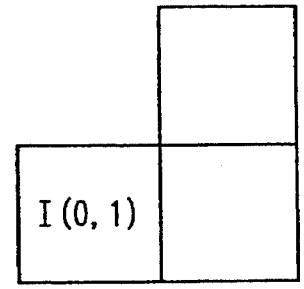
Figure 30J:
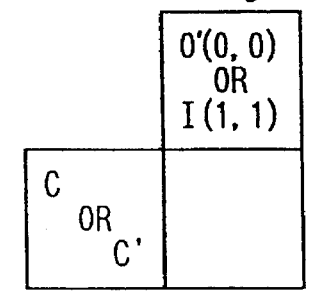
Figure 30K:
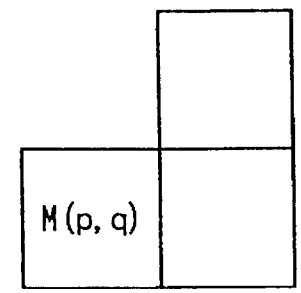
Figure 30L:
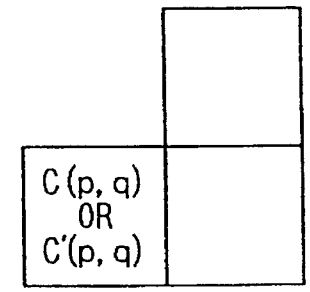
Figure 31A:
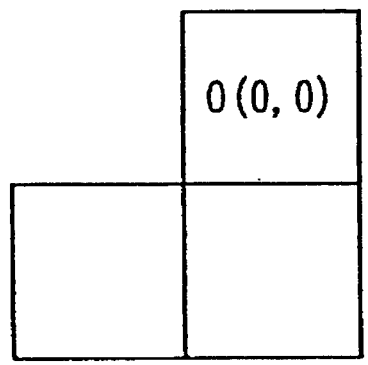
FIGS. 31(a)–31(f) are explanatory diagrams explaining the algorithm of the main-scan directional determination on the image portion.
Figure 31B:
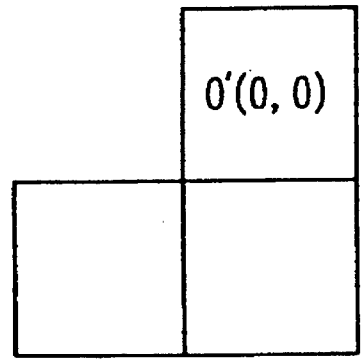
Figure 31C:
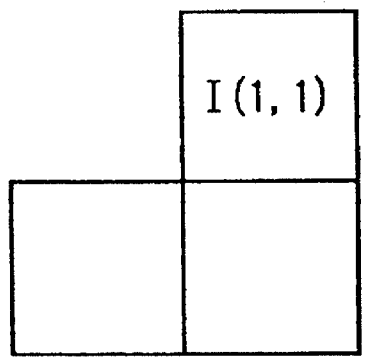
Figure 31D:
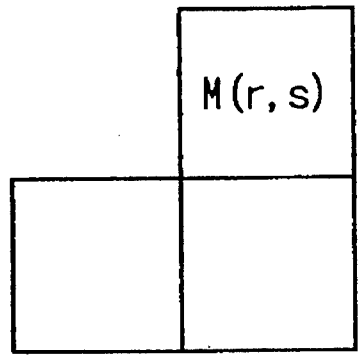
Figure 31E:
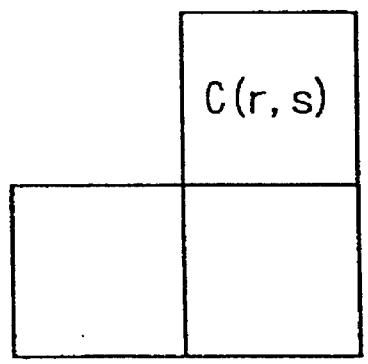
Figure 31F:
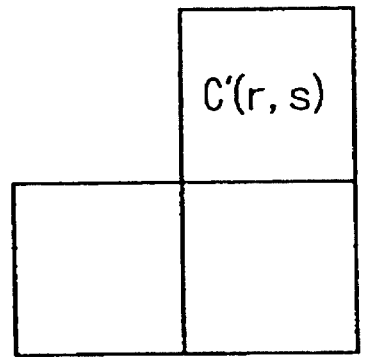

Next, the crossing portions are detected using the pixel patterns. In the event that an aimed pixel is contained in the image portion, if it is adjacent to the marker, there is a high possibility that the aimed pixel is contained in the image portion. Then, "Image portion adjacent the marker (C, C')" shown in Table 1 is assigned to such a pixel the area is determined according to description in a determination calculation table to be given later. In the area determining circuit 600 shown in FIG. 2, when a vertical line 631 crosses a marker 632 as shown in FIG. 28, if patterns where the image portion is sandwiched between markers holds, or when a horizontal line 633 crosses the marker 632 as shown in FIG. 29, if patterns where the image portion is sandwiched between markers holds, the pixels in the image portion are considered to be contained in the crossing portions (C, C') of the markers and the image part.

The LUT 601 shown in FIG. 22 stores determination calculation tables shown in Tables 2 to 5. In the case of the main-scan directional determination, one of the three different determination calculation tables is selected according to a status of the aimed pixel. When the aimed pixel belongs to the texture portion (marker flag="0", texture flag="1"), Table 2 is selected. When it belongs to a marker (marker flag="1"), Table 3 is selected. When it belongs to the image portion (marker flag="0", texture flag="0"), Table 4 is selected. A provisional status/history of the aimed pixel is determined according to the description of the selected table. In the reverse main-scan directional determination, the provisional status/history of the aimed pixel is determined according to Table 5. In the table, "—" indicates "0" or "1".

TABLE 2

| | Row: Provisional status/history of the left pixel<br>Column: Final status/history of the upper pixel | | | | | | | | |
| --- | --- | --- | --- | --- | --- | --- | --- | --- | --- |
| | O(0, 0) | O'(0, 0) | I(1, 1) | M(—, 0) | M(—, 1) | C(—, 0) | C(—, 1) | C'(—, 0) | C'(—, 1) |
| O(0, 0) | O(0, 0) | O(0, 0) | O(0, 0) | O(0, 0) | O,(0, 0) | O(0, 0) | O(0, 0) | O(0, 0) | O(0, 0) |
| O'(0, 0) | O(0, 0) | O'(0, 0) | I(0, 1) | O'(0, 0) | O'(0, 0) | O'(0, 0) | O'(0, 0) | O'(0, 0) | O'(0, 0) |
| O'(1, 0) | O(0, 0) | O'(1, 0) | I(1, 1) | O'(1, 0) | I(1, 1) | O'(1, 0) | I(1, 1) | O'(1, 0) | I(1, 1) |
| I(0, 1) | O(0, 0) | O'(0, 0) | I(0, 1) | O'(0, 0) | I(0, 1) | O'(0, 0) | I(0, 1) | O'(0, 0) | I(0, 1) |
| I(1, 1) | O(0, 0) | O'(1, 0) | I(1, 1) | I(1, 1) | I(1, 1) | I(1, 1) | I(1, 1) | I(1, 1) | I(1, 1) |
| X(0, —) | O(0, 0) | O'(0, 0) | I(1, 1) | X(0, 0) | X(0, 1) | X(0, 0) | X(0, 1) | X(0, 0) | X(0, 1) |
| X(1, —) | O(0, 0) | O'(0, 0) | I(1, 1) | X(1, 0) | X(1, 1) | X(1, 0) | X(1, 1) | X(1, 0) | X(1, 1) |
| M(0, —) | O(0, 0) | O'(0, 0) | I(1, 1) | X(0, 0) | X(0, 1) | X(0, 0) | X(0, 1) | X(0, 0) | X(0, 1) |
| M(1, —) | O(0, 0) | O'(0, 0) | I(1, 1) | X(1, 0) | X(1, 1) | X(1, 0) | X(1, 1) | X(1, 0) | X(1, 1) |

TABLE 2-continued

Row: Provisional status/history of the left pixel
Column: Final status/history of the upper pixel

|        | O(0, 0) | O'(0, 0) | I(1, 1) | M(—, 0) | M(—, 1) | C(—, 0) | C(—, 1) | C'(—, 0) | C'(—, 1) |
|--------|---------|----------|---------|---------|---------|---------|---------|----------|----------|
| C(0, —) | O(0, 0) | O'(0, 0) | I(1, 1) | O(0, 0) | O(0, 0) | O(0, 0) | O(0, 0) | O(0, 0) | O(0, 0) |
| C(1, —) | O(0, 0) | O'(0, 0) | I(1, 1) | O(0, 0) | O(0, 0) | O(0, 0) | O(0, 0) | O(0, 0) | O(0, 0) |
| C'(0, —) | O(0, 0) | O'(0, 0) | I(1, 1) | X(0, 0) | X(0, 1) | X(0, 0) | X(0, 1) | X(0, 0) | X(0, 1) |
| C'(1, —) | O(0, 0) | O'(0, 0) | I(1, 1) | X(1, 0) | X(1, 1) | X(1, 0) | X(1, 1) | X(1, 0) | X(1, 1) |

TABLE 3

Row: Provisional status/history of the left pixel
Column: Final status/history of the upper pixel

|        | O(0, 0) | O'(0, 0) | I(1, 1) | M(—, 0) | M(—, 1) | C(—, 0) | C(—, 1) | C'(—, 0) | C'(—, 1) |
|--------|---------|----------|---------|---------|---------|---------|---------|----------|----------|
| O(0, 0) | M(1, 1) | M(1, 1) | M(1, 0) | M(1, 0) | M(1, 1) | M(1, 0) | M(1, 1) | M(1, 0) | M(1, 1) |
| O'(0, 0) | M(1, 1) | M(1, 1) | M(1, 0) | M(1, 0) | M(1, 1) | M(1, 0) | M(1, 1) | M(1, 0) | M(1, 1) |
| O'(1, 0) | M(0, 1) | M(0, 1) | M(0, 0) | M(0, 0) | M(0, 1) | M(0, 0) | M(0, 1) | M(0, 0) | M(0, 1) |
| I(0, 1) | M(1, 1) | M(1, 1) | M(1, 0) | M(1, 0) | M(1, 1) | M(1, 0) | M(1, 1) | M(1, 0) | M(1, 1) |
| I(1, 1) | M(0, 1) | M(0, 1) | M(0, 0) | M(0, 0) | M(0, 1) | M(0, 0) | M(0, 1) | M(0, 0) | M(0, 1) |
| X(0, —) | M(1, 1) | M(1, 1) | M(1, 0) | M(1, 0) | M(1, 1) | M(1, 0) | M(1, 1) | M(1, 0) | M(1, 1) |
| X(1, —) | M(0, 1) | M(0, 1) | M(0, 0) | M(0, 0) | M(0, 1) | M(0, 0) | M(0, 1) | M(0, 0) | M(0, 1) |
| M(0, —) | M(0, 1) | M(0, 1) | M(0, 0) | M(0, 0) | M(0, 1) | M(0, 0) | M(0, 1) | M(0, 0) | M(0, 1) |
| M(1, —) | M(1, 1) | M(1, 1) | M(1, 0) | M(1, 0) | M(1, 1) | M(1, 0) | M(1, 1) | M(1, 0) | M(1, 1) |
| C(0, —) | M(0, 1) | M(0, 1) | M(0, 0) | M(0, 0) | M(0, 1) | M(0, 0) | M(0, 1) | M(0, 0) | M(0, 1) |
| C(1, —) | M(1, 1) | M(1, 1) | M(1, 0) | M(1, 0) | M(1, 1) | M(1, 0) | M(1, 1) | M(1, 0) | M(1, 1) |
| C'(0, —) | M(0, 1) | M(0, 1) | M(0, 0) | M(0, 0) | M(0, 1) | M(0, 0) | M(0, 1) | M(0, 0) | M(0, 1) |
| C'(1, —) | M(1, 1) | M(1, 1) | M(1, 0) | M(1, 0) | M(1, 1) | M(1, 0) | M(1, 1) | M(1, 0) | M(1, 1) |

TABLE 4

Row: Provisional status/history of the left pixel
Column: Final status/history of the upper pixel

|        | O(0, 0) | O'(0, 0) | I(1, 1) | M(a, 0) | M(a, 1) | C(a, 0) | C(a, 1) | C'(a, 0) | C'(a, 1) |
|--------|---------|----------|---------|---------|---------|---------|---------|----------|----------|
| O(0, 0) | O(0, 0) | O(0, 0) | O(0, 0) | C'(1, 0) | C'(1, 1) | O(0, 0) | O(0, 0) | C'(1, 0) | C'(1, 1) |
| O'(0, 0) | O(0, 0) | O(0, 0) | I(0, 1) | C'(1, 0) | C'(1, 1) | O'(0, 0) | O'(0, 0) | C'(1, 0) | C'(1, 1) |
| O'(1, 0) | O(0, 0) | O'(1, 0) | I(1, 1) | C'(0, 0) | C'(0, 1) | O'(1, 0) | O'(1, 0) | C'(0, 0) | C'(0, 1) |
| I(0, 1) | O(0, 0) | O'(0, 1) | I(0, 1) | C'(1, 0) | C'(1, 1) | I(0, 1) | I(0, 1) | C'(1, 0) | C'(1, 1) |
| I(1, 1) | O(0, 0) | O'(0, 0) | I(1, 1) | C'(0, 0) | C'(0, 1) | I(1, 1) | I(1, 1) | C'(0, 0) | C'(0, 1) |
| X(0, d) | O(0, 0) | O'(0, 0) | I(1, 1) | X(0, 0) | X(0, 1) | X(0, d) | X(0, d) | C'(a, 0) | C'(a, 1) |
| X(1, d) | O(0, 0) | O'(0, 0) | I(1, 1) | X(1, 0) | X(1, 1) | X(1, d) | X(1, d) | C'(a, 0) | C'(a, 1) |
| M(0, d) | C(0, d) | C(0, d) | I(1, 1) | X(0, 0) | X(0, 1) | X(0, d) | X(0, d) | C(0, d) | C(0, d) |
| M(1, d) | C(1, d) | C(1, d) | I(1, 1) | X(1, 0) | X(1, 1) | X(1, d) | X(1, d) | C(1, d) | C(1, d) |
| C(0, d) | C(0, d) | C(0, d) | C(0, d) | C(0, d) | C(0, d) | C(0, 0) | C(0, 1) | C(0, d) | C(0, d) |
| C(1, d) | C(1, d) | C(1, d) | C(1, d) | C(1, d) | C(1, d) | C(1, 0) | C(1, 1) | C(1, d) | C(1, d) |
| C'(0, d) | O(0, 0) | O'(0, 0) | I(1, 1) | X(0, 0) | X(0, 1) | X(0, 0) | X(0, 1) | C'(0, d) | C'(0, d) |
| C'(1, d) | O(0, 0) | O'(0, 0) | I(1, 1) | X(1, 0) | X(1, 1) | X(1, 0) | X(1, 1) | C'(1, d) | C'(1, d) |

TABLE 5

Row: Provisional status/history of the aimed pixel
Column: Final status/history of the right pixel

|        | O(0, 0) | O'(0, 0) | I(1, 1) | M(0, b) | M(1, b) | C(0, b) | C(1, b) | C'(0, b) | C'(1, b) |
|--------|---------|----------|---------|---------|---------|---------|---------|----------|----------|
| O(0, 0) | O(0, 0) | O(0, 0) | O(0, 0) | O(0, 0) | O(0, 0) | O(0, 0) | O(0, 0) | O(0, 0) | O(0, 0) |
| O'(0, 0) | O(0, 0) | O'(0, 0) | I(1, 1) | O'(0, 0) | O'(0, 0) | O'(0, 0) | O'(0, 0) | O'(0, 0) | O'(0, 0) |
| O'(1, 0) | O(0, 0) | O'(0, 0) | I(1, 1) | O'(0, 0) | I(1, 1) | O'(0, 0) | I(1, 1) | O'(0, 0) | I(1, 1) |
| I(0, 1) | O(0, 0) | O'(0, 0) | I(1, 1) | O'(0, 0) | I(1, 1) | O'(0, 0) | I(1, 1) | O'(0, 0) | I(1, 1) |

TABLE 5-continued

| | Row: Provisional status/history of the aimed pixel Column: Final status/history of the right pixel | | | | | | | | |
|---|---|---|---|---|---|---|---|---|---|
| | O(0, 0) | O'(0, 0) | I(1, 1) | M(0, b) | M(1, b) | C(0, b) | C(1, b) | C'(0, b) | C'(1, b) |
| I(1, 1) | O(0, 0) | O'(0, 0) | I(1, 1) | I(1, 1) | I(1, 1) | I(1, 1) | I(1, 1) | I(1, 1) | I(1, 1) |
| X(0, —) | O(0, 0) | O'(0, 0) | I(1, 1) | O'(0, 0) | I(1, 1) | O'(0, 0) | I(1, 1) | O'(0, 0) | I(1, 1) |
| X(1, —) | O(0, 0) | O'(0, 0) | I(1, 1) | I(1, 1) | I(1, 1) | I(1, 1) | I(1, 1) | I(1, 1) | I(1, 1) |
| M(—, 0) | M(1, 0) | M(1, 0) | M(0, 0) | M(0, 0) | M(1, 0) | M(0, 0) | M(1, 0) | M(0, 0) | M(1, 0) |
| M(—, 1) | M(1, 1) | M(1, 1) | M(0, 1) | M(0, 1) | M(1, 1) | M(0, 1) | M(1, 1) | M(0, 1) | M(1, 1) |
| C(—, 0) | O(0, 0) | O'(0, 0) | I(1, 1) | C(0, b) | C(1, b) | C(0, b) | C(1, b) | C(0, b) | C(1, b) |
| C(—, 1) | O(0, 0) | O'(0, 1) | I(1, 1) | C(0, b) | C(1, b) | C(0, b) | C(1, b) | C(0, b) | C(1, b) |
| C'(0, 0) | C'(1, 0) | C'(1, 0) | I(1, 1) | C(0, b) | C(1, b) | C(0, b) | C(1, b) | C(0, b) | C(1, b) |
| C'(0, 1) | C'(1, 1) | C'(1, 1) | I(1, 1) | C(0, b) | C(1, b) | C(0, b) | C(1, b) | C(0, b) | C(1, b) |
| C'(1, 0) | O(0, 0) | O'(0, 0) | C'(1, 0) | C(0, b) | C(1, b) | C(0, b) | C(1, b) | C(0, b) | C(1, b) |
| C'(1, 1) | O(0, 0) | O'(0, 0) | C'(1, 1) | C(0, b) | C(1, b) | C(0, b) | C(1, b) | C(0, b) | C(1, b) |

The types of status to be input to the area flag generating circuit 620 are those status O, O', M, I, C, and C' in Table 1. Where, with the edge of the inner part of a marker, an area flag is set within the closed loop, an area flag is set for the pixel having the status I. Where, with the edge of the outside of the marker, the area flag is set within the closed loop, the area flag is set for the pixel having the status M and I. The edit process is carried out in the subsequent circuit according to the area flag.

Next, Table 2 will be described in detail. When the aimed pixel is contained in the texture portion on the original document, it is determined that the aimed pixel has any of the statuses O, O', I and X. The priority levels of the provisional status of the left pixel and the final status of the upper pixel determines a provisional status of the aimed pixel. In this embodiment, the priority levels are: O>O'>I >X>M, C, C'. The priority levels are set up so that the outside of a closed loop enclosed by a marker is given the highest priority. The provisional status of the aimed pixel is the higher of the priority levels of the final status of the upper pixel and the provisional status of the left pixel. For the statuses M, C, and C' having the same priority level, its status is X. In an exceptional case where the provisional status of the left pixel is C, if the final status of the upper pixel is any of M, C, and C', the provisional status of the aimed pixel is O.

The determination algorithm in Table 2 will be described with reference to FIGS. 30(*a*)–30(*l*). In the description to follow, the status of the upper pixel is the final status, and the status of the left pixel and the aimed pixel is the provisional status. When the upper pixel or the left pixel is O(0, 0) as shown in FIGS. 30(*a*) and 30(*b*), the aimed pixel is O(0, 0). When the upper pixel is M(i, j) and the left pixel is M(k, l) as shown in FIG. 30(*c*), the aimed pixel is X(k, j). When the left pixel is X(k, l) as shown in FIG. 30(*d*), if the upper pixel is M(i, j), C(i, j) or C'(i, j), the aimed pixel is I(1, 1). In this case, if the upper pixel is O'(0, 0), the aimed pixel is O'(0, 0).

A case where the upper pixel is any of other statuses than O(0, 0) will be described. When the upper pixel is O'(0, 0) or I(1, 1), and the left pixel is M as shown in FIG. 30(*e*), the status of the aimed pixel is the same as that of the upper pixel. When the left pixel is I(1, 1) as shown in FIG. 30(*f*), if the upper pixel is any of other status than O'(0, 0), the aimed pixel I(1, 1). In this case, if the upper pixel is O'(0, 0), the aimed pixel is O'(1, 0). When the left pixel is O'(0, 0) as shown in FIG. 30(*g*), if the upper pixel I(1, 1), the aimed pixel is I(0, 1). In other cases, the aimed pixel O'(0, 0). When the left pixel is O'(1, 0) as shown in FIG. 30(*h*), if the final status of the upper pixel is any of other status than O and the sub-scan history is 1, the aimed pixel is I(1, 1). If the final status of the upper pixel is any of other status than O, the aimed pixel is O'(1, 0). When the left pixel is I(0, 1) as shown in FIG. 30(*i*), if the final status of the upper pixel is any of other status than O and the sub-scan history is 0, the aimed pixel is O'(0, 0) If the final status of the upper pixel is any of other status than O and the sub-scan history is 1, the aimed pixel is I(0, 1).

When the left pixel is C or C' as shown in FIG. 30(*j*), if the upper pixel is O'(0, 0), the aimed pixel is O'(0, 0). If the upper pixel is I(1, 1), the aimed pixel is I(1, 1). When the left pixel is M(p, q) as shown in FIG. 30(*k*), if the upper pixel is C(r, s), the aimed pixel is X(p, s). If the upper pixel is C'(r, s), the aimed pixel is X(p, s). When the left pixel is C(p, q) as shown in FIG. 30(*l*), if the upper pixel is M(r, s), C(r, s), C'(r, s), the aimed pixel is O(0, 0). When the left pixel is C'(p, q), if the upper pixel is M(r, s), C(r, s), C'(r, s), the aimed pixel is X (p, s).

On the first line, the aimed pixel is O(0, 0) irrespective of the status/history of the upper pixel and the left pixel.

Table 3 will be described in detail. If the marker flag is 1, the status of the aimed pixel is always M. At this time, if the provisional status of the left pixel is any of other status than M, C, and C', control determines that in the main-scan direction the pixel of the marker has been changed to the marker pixel, and inverts the main-scan history. Similarly, if the final status of the upper pixel is any of other status than M, C, and C', control determines that in the main-scan direction the pixel of the marker has been changed to the marker pixel, and inverts the sub-scan history. In other cases, the history remains unchanged. On the first line, the provisional status of the aimed pixel is M and the sub-scan history is 1. If the provisional status of the left pixel is any of M, C, and C', the main-scan history is the same as that of the left pixel. If the provisional status of the left pixel is any of O, O', I, and X, the main-scan history is the inverted main-scan history of the left pixel.

Table 4 will be described in detail. The table determines a candidate of the pixel for the crossing portion crossing the marker when the aimed pixel is contained in the image portion. It may be a candidate for the crossing portion when the provisional status of the left pixel is M or C (in Table 4 the determination result is C) or when the final status of the upper pixel is M or C' (in Table 4 the determination result is C'). The determination result C is a candidate a marker may cross in the main-scan direction as shown in FIG. 28. The determination result C' is a candidate which a marker may cross in the sub-scan direction as shown in FIG. 29. When the reverse main-scan directional determination shows that those candidates belong to the crossing portions, the candidates have the final statuses of C and C'. When the candidates do not belong to the crossing portions, control determines that those belong to the inside or the outside of the closed loop, and their final status is any of the statuses O, O' or I.

When the marker flag=0 and the texture flag=0, viz., the aimed pixel is contained in the image portion on the original document, and the aimed pixel is adjacent to the marker, there is a high possibility that the pixel belongs to the crossing portion of the marker and the image portion. Accordingly, in such a case, Table 4 determines that the aimed pixel has the status C or C'. The conditions of determining that the status of the aimed pixel are C is: 1) when the provisional statue of the left pixel is M, the final status of the upper pixel is any of O, O' and C', or and 2) the provisional status of the left pixel is C. The conditions of determining that the status of the aimed pixel are C' is: 1) when the final statue of the upper pixel is M, the provisional status of the left pixel is any of O, O' and C', or and 2) the final status of the upper pixel is C', and the provisional status of the left pixel is any other status than the statuses M and C.

The determination algorithm of Table 4 will be described with reference to FIGS. 31(*a*)–31(*f*). When the upper pixel is O(0, 0) as shown in (a) of FIG. 31(*a*), if the left pixel is M(p, q) or C(p, q), the aimed pixel is C(p, q). In this case, if the left pixel takes any other status than M(p, q) and C(p, q), the aimed pixel is O(0, 0). When the upper pixel is O'(0, 0) as shown in FIG. 31(*b*), if the left pixel is M(p, q) or C(p, q), the aimed pixel is C(p, q). If the left pixel is O(0, 0), the aimed pixel is O(0, 0). If the left pixel takes any other status than M(p, q), C(p, q), and O(0, 0), the aimed pixel is O(0, 0).

When the upper pixel is I(1, 1) as shown in FIG. 31(*c*), if the left pixel is C(p, q), the aimed pixel is C(p, q), and if the left pixel is O(0, 0), the aimed pixel is O(0, 0). When the left pixel is O' or I, if the main-scan history of the left pixel is 0, the aimed pixel is I(0, 1). In other cases, the aimed pixel is I(1, 1). When the upper pixel is M(r, s) as shown in FIG. 31(*d*), if the left pixel is M(p, q), the aimed pixel is X(p, s), and if the left pixel is C(p, q), the aimed pixel is C(p, q). When the left pixel is X(p, q) or C'(p, q), the aimed pixel is X(p, s). In other cases, the aimed pixel has the provisional status of C', and the main-scan history is the inverted main-scan history of the left pixel, and the sub-scan history is s.

When the upper pixel is C(r, s) as shown in FIG. 31(*e*), if the left pixel is C'(p, q), the aimed pixel is X(p, s), and if the left pixel is M(p, q), the aimed pixel is X(p, q). If the left pixel is C(p, q), the aimed pixel is C(p, q). In other cases, the aimed pixel has the same status as that of the left pixel.

When the upper pixel is C(p, q) as shown in FIG. 31(*f*), if the left pixel is C(p, q), the aimed pixel is C(p, s), and if the left pixel is C'(p, q), the aimed pixel is C'(p, q). If the left pixel is C'(p, q), the aimed pixel is C'(p, q). If the left pixel is X(p, q), the main-scan history and the sub-scan history of the aimed pixel are C', which is the same as that of the upper pixel. In other cases, the main-scan history of the aimed pixel is the inverted main-scan history of the left pixel. The sub-scan history thereof is C', which is the same as that of the upper pixel.

On the first line, if the provisional status of the left pixel is any of M, C and C', the provisional status of the aimed pixel is C, and its main-scan and sub-scan histories are the same as those of the left pixel. If the provisional status of the left pixel is any of O, O', I and X, the aimed pixel is O(0, 0).

Table 5 will be described in detail. This table is for determining an aimed pixel from the right side. What are used for the determination are the provisional status/history of the aimed pixel and the final status/history of the right pixel, which are determined by Tables 2 to 4. The reverse main-scan directional determination is used for finally determining the inside and outside of the closed loop, and the crossing portion. With regard to the pixel of the marker, the pixel which is determined to belong to the marker is unconditionally treated as the marker pixel. That is, if the provisional status of the aimed pixel is M, the final status of the aimed pixel is M. If the provisional status of the aimed pixel is O, the final status of the aimed pixel is O. When the final status of the right pixel is O, if the provisional status of the aimed pixel is any of O', I, X and C, the final status of the aimed pixel is O. As a result, if any of the upper and right and left sides is the outside, and the aimed pixel is neither the marker nor the crossing portion, it is always outside the closed loop. Similarly, when the final status of the right pixel is O', if the provisional status of the aimed pixel is any of O', I and X, the final status of the aimed pixel is O'. When the final status of the right pixel is I, if the provisional status of the aimed pixel is any of O', I and X, the final status of the aimed pixel is I.

The determination when the provisional status of the aimed pixel is C or C', is important in this table. When the provisional status of the aimed pixel is C, if the right pixel is the marker (M) or the crossing portion (C, C'), the final status is C. In other cases, it is the same as the final status of the right pixel. This is because only what is horizontally sandwiched between the marker and the crossing portion is determined to be the crossing portion of the marker with respect to the image portion. When the provisional status is C', the determination is made in the following way. 1) If the main-scan history is 0, the left pixel is within the closed loop. Accordingly, if the right pixel is within the closed loop (I), the final status is I. If the right pixel is outside (O, O'), the status of the crossing portion is C'. 2) If the main-scan history is 1, the left pixel is outside the closed loop. Then, if the right pixel is outside the closed loop (O, O'), the final status is O or O'. If the right pixel is within the closed loop (I), tile status of crossing portion is C'. 3) If the right pixel belongs to the marker or the crossing portion, the final status is C.

The determination algorithm of Table 5 will be described with reference to FIG. 32(*a*). When the right pixel is O(0, 0) as shown in FIG. 32(*a*), if the provisional status is M, the main-scan history is set to 1, and the sub-scan history remains unchanged. If the provisional status is any of C, O, O', I and X, it is O(0, 0). When the provisional status/history is C'(k, l), if k=0, it is C'(1, 1). If k=1, it is O(0, 0). When the right pixel is N(i, j) as shown in FIG. 32(*b*), if the provisional status is M, the main-scan history is set to i, and the sub-scan history remains unchanged. If the provisional status/history is X(k, l), it is O'(0, 0) only when i=0 and k=0. In other cases, it is I(1, 1). If the provisional status is C or C', it is C(i, j).

When the right pixel is I(1, 1) as shown in FIG. 32(*c*), if the provisional status is M(j, k), it is M(0, k). If the provisional status is M(j, k), it is M(0, k). If the provisional status is C(j, k), it is I(1, 1). When the provisional status is C'(j, k), if j=0, it is I(1, 1). If j=1, it is C'(1, k). When the right pixel is O'(1, 1) as shown in FIG. 32(*d*), if the provisional status is X(j, k), I(*1, 1*) or O'(0, 0), it is O'(0, 0). If the provisional status is C(j, k), it is O'(0, 0). When the provisional status is C'(j, k), if j=0, it is C'(1, k). If j=1, it is O'(0, 0).

Figure 32A:
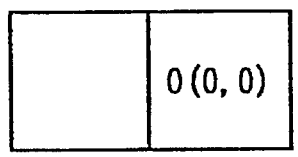
FIGS. 32(a)–32(k) are explanatory diagrams explaining the algorithm of the reverse main-scan directional determination.
Figure 32B:
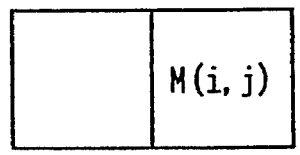
Figure 32C:
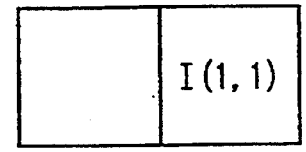
Figure 32D:
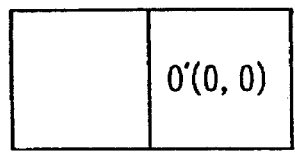
Figure 32E:
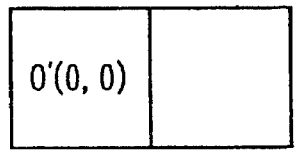
Figure 32F:
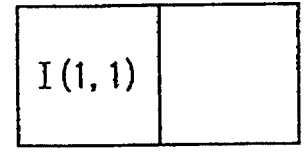
Figure 32G:
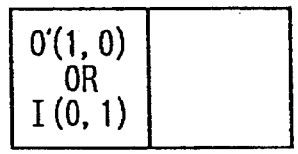
Figure 32H:
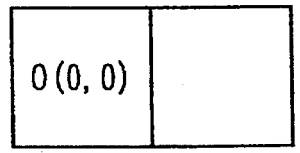

When the provisional status/history is O'(0, 0) as shown in FIG. 32(e), if the right pixel is O(0, 0), it is O(0, 0). If the provisional status is I(1, 1), it is I(0, k). If the right pixel is any of other statuses than O(0, 0) and I(1, 1), it is O'(0, 0). When the provisional status/history is I(1, 1) as shown in FIG. 32(f), if the right pixel is O(0, 0), it is O(0, 0). If the right pixel is O'(0, 0), it is O(0, 0). If the right pixel is any of other status than O(0, 0) and O'(0, 0), it is I(1, 1). When the provisional status/history is O'(1, 0) or I(0, 1) as shown in FIG. 32(g), if the right pixel is O(0, 0), it is O(0, 0). If the right pixel is any other status than O(0, 0) and the main-scan history is 0, it is O'(0, 0). If the right pixel is any of other status than O(0, 0) and the main-scan history is 1, it is I(1, 1). When the provisional status is O(0, 0) as shown in FIG. 32(h), it is O(0, 0).

Figure 32I:
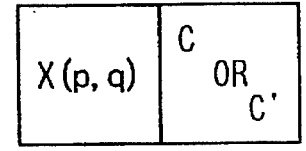
Figure 32J:
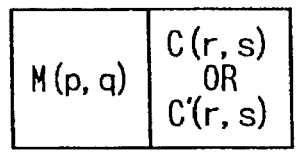
Figure 32K:
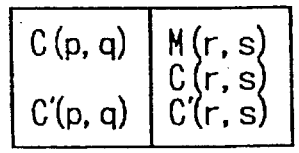

When the provisional status is X(p, q) and the right pixel is C or C' as shown in FIG. 32(i), if p=0 and the main-scan history of the right pixel=0, it is O'(0, 0). In other cases, it is I(1, 1). When the provisional status is M(p, q) and the right pixel is C(r, s) as shown in FIG. 32(j), it is M(r, s). When the provisional status is C(p, q) or C'(p, q) and the right pixel is M(r, s), C(r, s) or C'(r, s), it is C(r, s).

Figure 33:
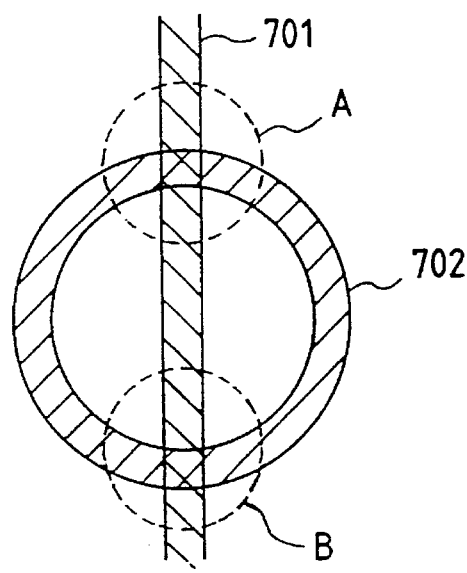
FIG. 33 is a diagram showing crossing portions when a vertical line crosses a marker.
Figure 34:
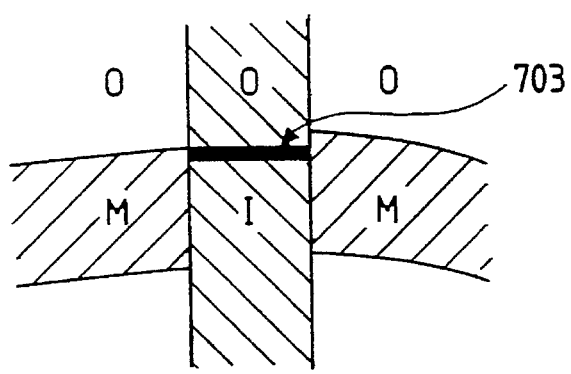
FIG. 34 is a diagram showing the result of determining a crossing portion A in FIG. 33.
Figure 35:
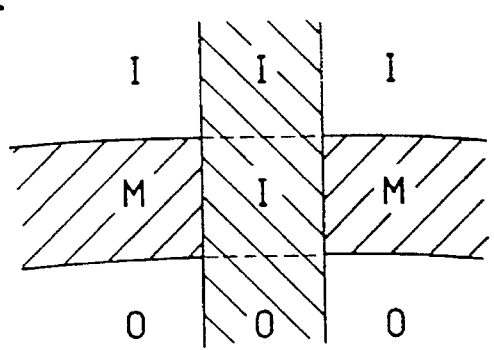
FIG. 35 is a diagram showing the result of determining a crossing portion B in FIG. 33.
Figure 36:
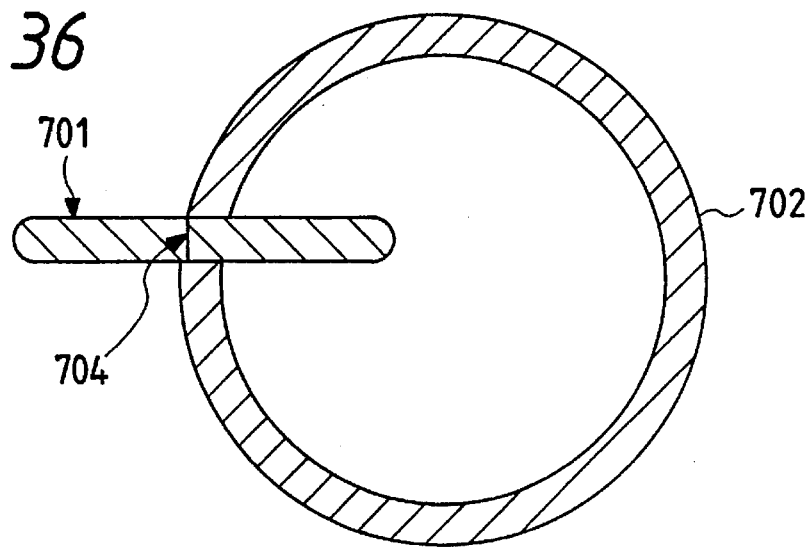
FIG. 36 is a diagram showing a crossing portion when a horizontal line crosses a marker.

The results of the determinations performed using the determination calculation tables shown in Tables 2 to 5 will be described with reference to FIGS. 33 to 36. FIG. 33 is a diagram showing crossing portions when a vertical line crosses a marker. FIG. 34 is a diagram showing the result of determining a crossing portion A in FIG. 33. FIG. 35 is a diagram showing the result of determining a crossing portion B in FIG. 33. FIG. 36 is a diagram showing a crossing portion when a horizontal line crosses a marker. In the figure, reference numeral 701 designates an image portion; 702, a marker; 703, a pixel to be determined to be C; and 704, a pixel to be determined to be C'. In the determination calculation tables, Tables 2 to 5, an aimed pixel surrounded by first and second pixels is detected. As shown in FIG. 34, the first pixel is located above the aimed pixel and has the status of O. The second pixel is located on the left side of the aimed pixel and has the status of M or C. The aimed pixel has a provisional status C. When the right pixel has the status M or C as the result of the reverse main-scan direction determination, it has the final status of C. In the determination on the second line, the pixel having the status C is handled like the pixel having the status M. That is, the determination result when the upper pixel has the status M is the same as that when it has the status C. When the upper pixel has the status I and the left pixel has the status M as shown in FIG. 35, the status of the crossing portion is determined to be I. When the right or left pixel has the status of O, the image portion is determined to have the status of O.

A crossing portion where the image crosses the marker that is presented by the determination calculation tables, Table 2 to 5, is designated by reference numeral 703 in FIG. 34. In the main-scan direction, the crossing portion is formed of the head line of the image portion horizontally sandwiched by the marker when seen in the main-scan direction, and the boundary portion between the inside and the outside of the closed loop, with the upper pixel constituting the marker. The determination method detects the crossing portions of the image and the marker in terms of the width of one pixel, and determines the surrounding pixels to be either in the inside or the outside of the closed loop. The advantage of this determination method resides in that an areal range determined to be within the closed loop is limited in variation irrespective of the thick of the marker and the size of the crossing portion. The disadvantage of this method resides in that the edit of the marker per se is difficult since most of the crossing portion is portioned out to the inside or the outside of the closed loop.

The following determination calculation tables, Tables 6 to 9, are used when the crossing portion of the marker and the image is determined for the maker.

TABLE 6

Row: Provisional status/history of the left pixel
Column: Final status/history of the upper pixel

|  | O(0, 0) | O'(0, 0) | I(1, 1) | M(—, 0) | M(—, 1) | C (—, 0) | C(—, 1) | C'(—, 0) | C'(—, 1) |
|---|---|---|---|---|---|---|---|---|---|
| O(0, 0) | O(0, 0) | O(0, 0) | O(0, 0) | O(0, 0) | O(0, 0) | O(0, 0) | O(0, 0) | O(1, 0) | O(0, 0) |
| O'(0, 0) | O(0, 0) | O'(0, 0) | I(0, 1) | O'(0, 0) | O'(0, 0) | O'(0, 0) | O'(0, 0) | O'(0, 0) | O'(0, 0) |
| O'(1, 0) | O(0, 0) | O'(1, 0) | I(1, 1) | O'(1, 0) | I(1, 1) | O'(1, 0) | I(1, 1) | O'(1, 0) | I(1, 1) |
| I(0, 1) | O(0, 0) | O'(0, 0) | I(0, 1) | O'(0, 0) | I(0, 1) | O'(0, 0) | I(0, 1) | O'(0, 0) | I(0, 1) |
| I(1, 1) | O(0, 0) | O'(1, 0) | I(1, 1) | I(1, 1) | I(1, 1) | I(1, 1) | I(1, 1) | I(1, 1) | I(1, 1) |
| X(0, —) | O(0, 0) | O'(0, 0) | I(1, 1) | X(0, 0) | X(0, 1) | X(0, 0) | X(0, 1) | X(0, 0) | X(0, 1) |
| X(1, —) | O(0, 0) | O'(0, 1) | I(1, 1) | X(1, 0) | X(1, 1) | X(1, 0) | X(1, 1) | X(1, 0) | X(1, 1) |
| M(0, —) | O(0, 0) | O'(0, 0) | I(1, 1) | X(0, 0) | X(0, 1) | X(0, 0) | X(0, 1) | X(0, 0) | X(0, 1) |
| M(1, —) | O(0, 0) | O'(0, 0) | I(1, 1) | X(1, 0) | X(1, 1) | X(1, 0) | X(1, 1) | X(1, 0) | X(1, 1) |
| C(0, —) | O(0, 0) | O'(0, 0) | I(1, 1) | X(0, 0) | X(0, 1) | X(0, 0) | X(0, 1) | X(0, 0) | X(0, 1) |
| C(1, —) | O(0, 0) | O'(0, 1) | I(1, 1) | X(1, 0) | X(1, 1) | X(1, 1) | X(1, 1) | X(1, 0) | X(1, 1) |
| C'(0, —) | O(0, 0) | O'(0, 0) | I(1, 1) | X(0, 0) | X(0, 1) | X(0, 0) | X(0, 1) | X(0, 0) | X(0, 1) |
| C'(1, —) | O(0, 0) | O'(0, 0) | I(1, 1) | X(1, 0) | X(1, 1) | X(1, 0) | X(1, 1) | X(1, 0) | X(1, 1) |

TABLE 7

Row: Provisional status/history of the left pixel
Column: Final status/history of the upper pixel

|  | O(0, 0) | O'(0, 0) | I(1, 1) | M(—, 0) | M(—, 1) | C(—, 0) | C(—, 1) | C'(—, 0) | C'(—, 1) |
|---|---|---|---|---|---|---|---|---|---|
| O(0, 0) | M(1, 1) | M(1, 1) | M(1, 0) | M(1, 0) | M(1, 1) | M(1, 0) | M(1, 1) | M(1, 0) | M(1, 1) |
| O'(0, 1) | M(1, 1) | M(1, 1) | M(1, 0) | M(1, 0) | M(1, 1) | M(1, 0) | M(1, 1) | M(1, 0) | M(1, 1) |
| O'(1, 0) | M(0, 1) | M(0, 1) | M(0, 0) | M(0, 0) | M(0, 1) | M(0, 0) | M(0, 1) | M(0, 0) | M(0, 1) |

TABLE 7-continued

Row: Provisional status/history of the left pixel
Column: Final status/history of the upper pixel

|        | O(0, 0) | O'(0, 0) | I(1, 1) | M(—, 0) | M(—, 1) | C(—, 0) | C(—, 1) | C'(—, 0) | C'(—, 1) |
|--------|---------|----------|---------|---------|---------|---------|---------|----------|----------|
| I(0, 1) | M(1, 1) | M(1, 1) | M(1, 0) | M(1, 0) | M(1, 1) | M(1, 0) | M(1, 1) | M(1, 0) | M(1, 1) |
| I(1, 1) | M(0, 1) | M(0, 1) | M(0, 0) | M(0, 0) | M(0, 1) | M(0, 0) | M(0, 1) | M(0, 0) | M(0, 1) |
| X(0, —) | M(1, 1) | M(1, 1) | M(1, 0) | M(1, 0) | M(1, 1) | M(1, 0) | M(1, 1) | M(1, 0) | M(1, 1) |
| X(1, —) | M(0, 1) | M(0, 1) | M(0, 0) | M(0, 0) | M(0, 1) | M(0, 0) | M(0, 1) | M(0, 0) | M(0, 1) |
| M(0, —) | M(0, 1) | M(0, 1) | M(0, 0) | M(0, 0) | M(0, 1) | M(0, 0) | M(0, 1) | M(0, 0) | M(0, 1) |
| M(1, —) | M(1, 1) | M(1, 1) | M(1, 0) | M(1, 0) | M(1, 1) | M(1, 0) | M(1, 1) | M(1, 0) | M(1, 1) |
| C(0, —) | M(0, 1) | M(0, 1) | M(0, 0) | M(0, 0) | M(0, 1) | M(0, 0) | M(0, 1) | M(0, 0) | M(0, 1) |
| C(1, —) | M(1, 1) | M(1, 1) | M(1, 0) | M(1, 0) | M(1, 1) | M(1, 0) | M(1, 1) | M(1, 0) | M(1, 1) |
| C'(0, —) | M(0, 1) | M(0, 1) | M(0, 0) | M(0, 0) | M(0, 1) | M(0, 0) | M(0, 1) | M(0, 0) | M(0, 1) |
| C'(1, —) | M(1, 1) | M(1, 1) | M(1, 0) | M(1, 0) | M(1, 1) | M(1, 0) | M(1, 1) | M(1, 0) | M(1, 1) |

TABLE 8

Row: Provisional status/history of the left pixel
Column: Final status/history of the upper pixel

|         | O(0, 0) | O'(0, 1) | I(1, 1) | H(a, 0) | M(a, 1) | C(a, 0) | C(a, 1) | C'(a, 0) | C'(a, 1) |
|---------|---------|----------|---------|---------|---------|---------|---------|----------|----------|
| O(0, 0) | O(0, 0) | O(0, 0)  | O(0, 0) | C'(a, 0) | C'(a, 1) | O(0, 0) | O(0, 0) | C'(a, 0) | C'(a, 1) |
| O'(0, 0) | O(0, 0) | O'(0, 0) | I(0, 1) | C'(a, 0) | C'(a, 1) | O'(0, 0) | O'(0, 0) | C'(a, 0) | C'(a, 1) |
| O'(1, 0) | O(0, 0) | O'(1, 0) | I(1, 1) | C'(a, 0) | C'(a, 1) | O'(1, 0) | O'(1, 0) | C'(a, 0) | C'(a, 1) |
| I(0, 1) | O(0, 0) | O'(0, 0) | I(0, 1) | C'(a, 0) | C'(a, 1) | I(0, 1) | I(0, 1) | C'(a, 0) | C'(a, 1) |
| I(1, 1) | O(0, 0) | O'(0, 1) | I(1, 1) | C'(a, 0) | C'(a, 1) | I(1, 1) | I(1, 1) | C'(a, 0) | C'(a, 1) |
| X(0, d) | O(0, 0) | O'(0, 0) | I(1, 1) | C'(a, 0) | C'(a, 1) | X(0, d) | X(0, d) | C'(a, 0) | C'(a, 1) |
| X(1, d) | O(0, 0) | O'(0, 0) | I(1, 1) | C'(a, 0) | C'(a, 1) | X(1, d) | X(1, d) | C'(a, 0) | C'(a, 1) |
| M(0, d) | C(0, d) | C(0, d) | C(0, d) | C'(0, 0) | C'(0, 1) | C(0, d) | C(0, d) | C'(0, d) | C'(0, d) |
| M(1, d) | C(1, d) | C(1, d) | C(1, d) | C'(1, 0) | C'(1, 1) | C(1, d) | C(1, d) | C'(1, d) | C'(1, d) |
| C(0, d) | C(0, d) | C(0, d) | C(0, d) | C(0, d) | C(0, d) | C(0, d) | C(0, 1) | C'(0, d) | C'(0, d) |
| C(1, d) | C(1, d) | C(1, d) | C(1, d) | C(1, d) | C(1, d) | C(1, 0) | C(1, 1) | C'(1, d) | C'(1, d) |
| C'(0, d) | O(0, 0) | O'(0, 0) | I(1, 1) | C'(a, 0) | C'(a, 1) | C(0, d) | C(0, d) | C'(0, d) | C'(0, d) |
| C'(1, d) | O(0, 0) | O'(0, 0) | I(1, 1) | C'(a, 0) | C'(a, 1) | C(1, d) | C(1, d) | C'(1, d) | C'(1, d) |

TABLE 9

Row: Provisional status/history of the aimed pixel
Colunm: Final status/history of the right pixel

|         | O(0, 0) | O'(0, 0) | I(1, 1) | M(0, b) | M(1, b) | C(0, b) | C(1, b) | C'(0, b) | C'(1, b) |
|---------|---------|----------|---------|---------|---------|---------|---------|----------|----------|
| O(0, 0) | O(0, 0) | O(0, 0) | O(0, 0) | O(0, 0) | O(0, 0) | O(0, 0) | O(0, 0) | O(0, 0) | O(0, 0) |
| O'(0, 0) | O(0, 0) | O'(0, 0) | I(1, 1) | O'(0, 0) | O'(0, 0) | O'(0, 1) | O'(0, 0) | O'(0, 0) | O'(0, 0) |
| O'(1, 0) | O(0, 0) | O'(0, 0) | I(1, 1) | O'(0, 0) | I(1, 1) | O'(0, 0) | I(1, 1) | O'(0, 0) | I(1, 1) |
| I(0, 1) | O(0, 0) | O'(0, 0) | I(1, 1) | O'(0, 0) | I(1, 1) | O'(0, 0) | I(1, 1) | O'(0, 0) | I(1, 1) |
| I(1, 1) | O(0, 0) | O'(0, 0) | I(1, 1) | I(1, 1) | I(1, 1) | I(1, 1) | I(1, 1) | I(1, 1) | I(1, 1) |
| X(0, —) | O(0, 0) | O'(0, 0) | I(1, 1) | O'(0, 0) | I(1, 1) | O'(0, 0) | I(1, 1) | O'(0, 0) | I(1, 1) |
| X(1, —) | O(0, 0) | O'(0, 0) | I(1, 1) | I(1, 1) | I(1, 1) | I(1, 1) | I(1, 1) | I(1, 1) | I(1, 1) |
| M(—, 0) | M(1, 0) | M(1, 0) | M(0, 0) | M(0, 0) | M(1, 0) | M(0, 0) | M(1, 0) | M(0, 0) | M(1, 0) |
| M(—, 1) | M(1, 1) | M(1, 1) | M(0, 1) | M(0, 1) | M(1, 1) | M(0, 1) | M(1, 1) | M(0, 1) | M(1, 1) |
| C(—, 0) | C(1, 0) | C(1, 0) | I(1, 1) | C(0, b) | C(1, b) | C(0, b) | C(1, b) | C(0, b) | C(1, b) |
| C(—, 1) | C(1, 1) | C(1, 1) | I(1, 1) | C(0, b) | C(1, b) | C(0, b) | C(1, b) | C(0, b) | C(1, b) |
| C'(—, 0) | C'(1, 0) | C'(1, 0) | C'(0, 0) | C'(0, b) | C'(1, b) | C'(0, b) | C'(1, b) | C'(0, b) | C'(1, b) |
| C'(—, 1) | C'(1, 1) | C'(1, 1) | C'(0, 1) | C'(0, b) | C'(1, b) | C'(0, b) | C'(1, b) | C'(0, b) | C'(1, b) |

Figure 37:
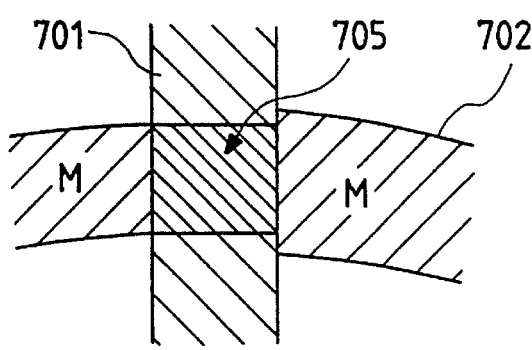
FIG. 37 is a diagram showing an area to be determined as a crossing portion by determination calculation tables, Tables 6 to 9, when the vertical line crosses the marker.
Figure 38:
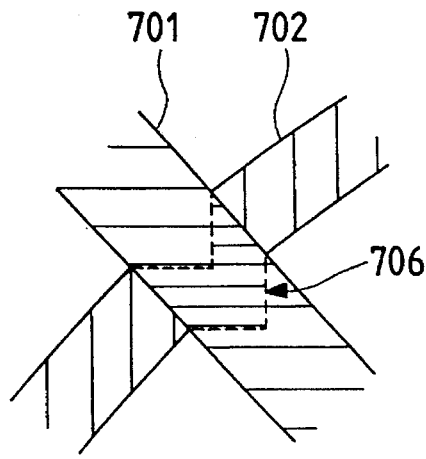
FIG. 38 is a diagram showing an area to be determined as a crossing portion by determination calculation tables, Tables 6 to 9, when the vertical line obliquely crosses the marker.

The results of determining an area by using this determination calculation table are illustrated in FIG. 37. As shown, the final status of an image portion 705 sandwiched by the pixels of the status M located on both sides thereof. If the pixels determined to have the status C and C' by the tables are handled as the pixels having the status M in the area flag generation circuit shown in FIG. 23, the crossing portion becomes the portion on the marker. The determination calculation tables are disadvantageous in that the areal range determined to be within the closed loop largely varies depending on the thick of the marker and the size of the crossing portion, and a portion 706 determined to be the crossing portion when the marker obliquely crosses the image as shown in FIG. 38, suffers from a large position error.

Thus, the determination calculation tables, Tables 2 to 8, and those tables, Tables 6 to 9, which have advantages and disadvantages as described above, are properly selectively used for the types of edit.

There is a case where the crossing portion of the marker and the image that extends within a preset distance is deemed to belong to a closed loop and that extending in excess of the preset distance is deemed not to belong to the closed loop. In this case, the conjunction correcting function of the marker flag generating device 61 and determination calculation tables shown in Tables 10 to 13. When the correction is made over 16 pixels in the main-scan and sub-scan directions, the determination calculation tables determines that the crossing portion having an omission of 15 pixels or less indicates a closed loop, and the crossing portion having an omission of 16 pixels or more indicates that the marker is broken off. The determination calculation tables, Tables 2 to 8, and those tables, Tables 6 to 9, are provided mainly for a line image on an original document. For those original images containing half-tone images, such as photograph, difficult to determine the density of the original texture, it is suggestible to use the conjunction correcting technique and the determination calculation tables, Tables 10 to 13. Any of those table groups, Tables 2 to 5, Tables 6 to 9, and Tables 10 to 13, can be selected from the control panel 213 shown in FIG. 1, through the CPU (2) 211 and the CPU (1) circuit 209.

TABLE 10

Row: Provisional status/history of the left pixel
Column: Final status/history of the upper pixel

|  | O(0, 0) | O'(0, 0) | I(1, 1) | M(—, 0) | M(—, 1) | C(—, 0) | C(—, 1) | C'(—, 0) | C'(—, 1) |
|---|---|---|---|---|---|---|---|---|---|
| O(0, 0) | O(0, 0) | O(0, 0) | O(0, 0) | O(0, 0) | O(0, 0) | O(0, 0) | O(0, 0) | O(0, 0) | O(0, 0) |
| O'(0, 0) | O(0, 0) | O'(0, 0) | I(0, 1) | O'(0, 0) | O'(0, 0) | O'(0, 0) | O'(0, 0) | O'(0, 0) | O'(0, 0) |
| O'(1, 0) | O(0, 0) | O'(1, 0) | I(1, 1) | O'(1, 0) | I(1, 1) | O'(1, 0) | I(1, 1) | O'(1, 0) | I(1, 1) |
| I(0, 1) | O(0, 0) | O'(0, 0) | I(0, 1) | O'(0, 0) | I(0, 1) | O'(0, 0) | I(0, 1) | O'(0, 0) | I(0, 1) |
| I(1, 1) | O(0, 0) | O'(1, 0) | I(1, 1) | I(1, 1) | I(1, 1) | I(1, 1) | I(1, 1) | I(1, 1) | I(1, 1) |
| X(0, —) | O(0, 0) | O'(0, 0) | I(1, 1) | X(0, 0) | X(0, 1) | X(0, 0) | X(0, 1) | X(0, 0) | X(0, 1) |
| X(1, —) | O(0, 0) | O'(0, 0) | I(1, 1) | X(1, 0) | X(1, 1) | X(1, 0) | X(1, 1) | X(1, 0) | X(1, 1) |
| M(0, —) | O(0, 0) | O'(0, 0) | I(1, 1) | X(0, 0) | X(0, 1) | X(0, 0) | X(0, 1) | X(0, 0) | X(0, 1) |
| M(1, —) | O(0, 0) | O'(0, 0) | I(1, 1) | X(1, 0) | X(1, 1) | X(1, 0) | X(1, 1) | X(1, 0) | X(1, 1) |
| C(0, —) | O(0, 0) | O'(0, 0) | I(1, 1) | O(0, 0) | O(0, 0) | O(0, 0) | O(0, 0) | O(0, 0) | O(0, 0) |
| C(1, —) | O(0, 0) | O'(0, 0) | I(1, 1) | O(0, 0) | O(0, 0) | O(0, 0) | O(0, 0) | O(0, 0) | O(0, 0) |
| C'(0, —) | O(0, 0) | O'(0, 0) | I(1, 1) | X(0, 0) | X(0, 1) | X(0, 0) | X(0, 1) | X(0, 0) | X(0, 1) |
| C'(1, —) | O(0, 0) | O'(0, 0) | I(1, 1) | X(1, 0) | X(1, 1) | X(1, 0) | X(1, 1) | X(1, 0) | X(1, 1) |

TABLE 11

Row: Provisional status/history of the left pixel
Column: Final status/history of the upper pixel

|  | O(0, 0) | O'(0, 0) | I(1, 1) | M(—, 0) | M(—, 1) | C(—, 0) | C(—, 1) | C'(—, 0) | C'(—, 1) |
|---|---|---|---|---|---|---|---|---|---|
| O(0, 0) | M(1, 1) | M(1, 1) | M(1, 0) | M(1, 0) | M(1, 1) | M(1, 0) | M(1, 1) | M(1, 0) | M(1, 1) |
| O'(0, 0) | M(1, 1) | M(1, 1) | M(1, 0) | M(1, 0) | M(1, 1) | M(1, 0) | M(1, 1) | M(1, 0) | M(1, 1) |
| O'(1, 0) | M(0, 1) | M(0, 1) | M(0, 0) | M(0, 0) | M(0, 1) | M(0, 0) | M(0, 1) | M(0, 0) | M(0, 1) |
| I(0, 1) | M(1, 1) | M(1, 1) | M(1, 0) | M(1, 0) | M(1, 1) | M(1, 0) | M(1, 1) | M(1, 0) | M(1, 1) |
| I(1, 1) | M(0, 1) | M(0, 1) | M(0, 0) | M(0, 0) | M(0, 1) | M(0, 0) | M(0, 1) | M(0, 0) | M(0, 1) |
| X(0, —) | M(1, 1) | M(1, 1) | M(1, 0) | M(1, 0) | M(1, 1) | M(1, 0) | M(1, 1) | M(1, 0) | M(1, 1) |
| X(1, —) | M(0, 1) | M(0, 1) | M(0, 0) | M(0, 0) | M(0, 1) | M(0, 0) | M(0, 1) | M(0, 0) | M(0, 1) |
| M(0, —) | M(0, 1) | M(0, 1) | M(0, 0) | M(0, 0) | M(0, 1) | M(0, 0) | M(0, 1) | M(0, 0) | M(0, 1) |
| M(1, —) | M(1, 1) | M(1, 1) | M(1, 0) | M(1, 0) | M(1, 1) | M(1, 0) | M(1, 1) | M(1, 0) | M(1, 1) |
| C(0, —) | M(0, 1) | M(0, 1) | M(0, 0) | M(0, 0) | M(0, 1) | M(0, 0) | M(0, 1) | M(0, 0) | M(0, 1) |
| C(1, —) | M(1, 1) | M(1, 1) | M(1, 0) | M(1, 0) | M(1, 1) | M(1, 0) | M(1, 1) | M(1, 0) | M(1, 1) |
| C'(0, —) | M(0, 1) | M(0, 1) | M(0, 0) | M(0, 0) | M(0, 1) | M(0, 0) | M(0, 1) | M(0, 0) | M(0, 1) |
| C'(1, —) | M(1, 1) | M(1, 1) | M(1, 0) | M(1, 0) | M(1, 1) | M(1, 0) | M(1, 1) | M(1, 0) | M(1, 1) |

TABLE 12

Row: Provisional status/history of the left pixel
Column: Final status/history of the upper pixel

|        | O(0, 0) | O'(0, 0) | I(1, 1) | M(a, 0) | M(a, 1) | C(a, 0) | C(a, 1) | C'(a, 0) | C'(a, 1) |
|--------|---------|----------|---------|---------|---------|---------|---------|----------|----------|
| O(0, 0) | O(0, 1) | O(0, 0)  | O(0, 0) | O(0, 0) | O(0, 0) | O(0, 0) | O(0, 0) | O(0, 0)  | O(0, 0)  |
| O'(0, 0) | O(0, 0) | O'(0, 0) | I(0, 1) | O'(0, 0) | O'(0, 1) | O'(0, 0) | O'(0, 0) | O'(0, 0) | O'(0, 0) |
| O'(1, 0) | O(0, 0) | O'(1, 0) | I(1, 1) | O'(1, 0) | I(1, 1)  | O'(1, 0) | I(1, 1)  | O'(1, 0) | I(1, 1)  |
| I(0, 1)  | O(0, 0) | O'(0, 0) | I(0, 1) | O'(0, 0) | I(0, 1)  | O'(0, 0) | I(0, 1)  | O'(0, 0) | I(0, 1)  |
| I(1, 1)  | O(0, 0) | O'(1, 0) | I(1, 1) | I(1, 1)  | I(1, 1)  | I(1, 1)  | I(1, 1)  | I(1, 1)  | I(1, 1)  |
| X(0, d)  | O(0, 0) | O'(0, 0) | I(1, 1) | X(0, 0)  | X(0, 1)  | X(0, 0)  | X(0, 1)  | X(0, 0)  | X(0, 1)  |
| X(1, d)  | O(0, 0) | O'(0, 0) | I(1, 1) | X(1, 0)  | X(1, 1)  | X(1, 0)  | X(1, 1)  | X(1, 0)  | X(1, 1)  |
| M(0, d)  | O(0, 0) | O'(0, 0) | I(1, 1) | X(0, 0)  | X(0, 1)  | X(0, 0)  | X(0, 1)  | X(0, 0)  | X(0, 1)  |
| M(1, d)  | O(0, 0) | O'(0, 0) | I(1, 1) | X(1, 0)  | X(1, 1)  | X(1, 0)  | X(1, 1)  | X(1, 0)  | X(1, 1)  |
| C(0, d)  | O(0, 0) | O'(0, 0) | I(1, 1) | O(0, 0)  | O(0, 0)  | O(0, 0)  | O(0, 0)  | O(0, 0)  | O(0, 0)  |
| C(1, d)  | O(0, 0) | O'(0, 0) | I(1, 1) | O(0, 0)  | O(0, 0)  | O(0, 0)  | O(0, 0)  | O(0, 0)  | O(0, 0)  |
| C'(0, d) | O(0, 0) | O'(0, 0) | I(1, 1) | X(0, 0)  | X(0, 1)  | X(0, 0)  | X(0, 1)  | X(0, 0)  | X(0, 1)  |
| C'(1, d) | O(0, 0) | O'(0, 1) | I(1, 1) | X(1, 0)  | X(1, 1)  | X(1, 0)  | X(1, 1)  | X(1, 0)  | X(1, 1)  |

TABLE 13

Row: Provisional status/history of the aimed pixel
Column: Final status/history of the right pixel

|         | O(0, 0) | O'(0, 0) | I(1, 1) | M(0, b) | M(1, b) | C(0, b) | C(1, b) | C'(0, b) | C'(1, b) |
|---------|---------|----------|---------|---------|---------|---------|---------|----------|----------|
| O(0, 0) | O(0, 0) | O(0, 0)  | O(0, 0) | O(0, 0) | O(0, 0) | O(0, 0) | O(0, 0) | O(0, 0)  | O(0, 0)  |
| O'(0, 0) | O(0, 0) | O'(0, 0) | I(1, 1) | O'(0, 0) | O'(0, 0) | O'(0, 0) | O'(0, 0) | O'(0, 0) | O'(0, 0) |
| O'(1, 0) | O(0, 0) | O'(0, 0) | I(1, 1) | O'(0, 0) | I(1, 1) | O'(0, 0) | I(1, 0) | O'(0, 0) | I(1, 1)  |
| I(0, 1)  | O(0, 0) | O'(0, 0) | I(1, 1) | O'(0, 0) | I(1, 1) | O'(0, 0) | I(1, 1) | O'(0, 0) | I(1, 1)  |
| I(1, 1)  | O(0, 0) | O'(0, 1) | I(1, 1) | I(1, 1)  | I(1, 1) | I(1, 1) | I(1, 1) | I(1, 1)  | I(1, 1)  |
| X(0, —)  | O(0, 0) | O'(0, 1) | I(1, 1) | O'(0, 0) | I(1, 1) | O'(0, 0) | I(1, 1) | O'(0, 0) | I(1, 1)  |
| X(1, —)  | O(0, 0) | O'(0, 1) | I(1, 1) | I(1, 1)  | I(1, 1) | I(1, 1) | I(1, 1) | I(1, 1)  | I(1, 1)  |
| M(—, 0)  | M(1, 0) | M(1, 0)  | M(0, 0) | M(0, 0) | M(1, 0) | M(0, 0) | M(1, 0) | M(0, 0)  | M(1, 0)  |
| M(—, 1)  | M(1, 1) | M(1, 1)  | M(0, 1) | M(0, 1) | M(1, 1) | M(0, 1) | M(1, 1) | M(0, 1)  | M(1, 1)  |
| C(—, 0)  | M(1, 0) | M(1, 0)  | M(0, 0) | M(0, 0) | M(1, 0) | M(0, 0) | M(1, 0) | M(0, 0)  | M(1, 0)  |
| C(—, 1)  | M(1, 1) | M(1, 1)  | M(0, 1) | M(0, 1) | M(1, 1) | M(0, 1) | M(1, 1) | M(0, 1)  | M(1, 1)  |
| C'(0, 0) | M(1, 0) | M(1, 0)  | M(0, 0) | M(0, 0) | M(1, 0) | M(0, 0) | M(1, 0) | M(0, 0)  | M(1, 0)  |
| C'(0, 1) | M(1, 1) | M(1, 1)  | M(0, 1) | M(0, 1) | M(1, 1) | M(0, 1) | M(1, 1) | M(0, 1)  | M(1, 1)  |
| C'(1, 0) | M(1, 0) | M(1, 0)  | M(0, 0) | M(0, 0) | M(1, 0) | M(0, 0) | M(1, 0) | M(0, 0)  | M(1, 0)  |
| C'(1, 1) | M(1, 1) | M(1, 1)  | M(0, 1) | M(0, 1) | M(1, 1) | M(0, 1) | M(1, 1) | M(0, 1)  | M(1, 1)  |

As seen from the foregoing description, the area recognition apparatus thus embodied detects the crossing portion of a marker and an image, and recognizes an area even when the marker for designating an area crosses the image, by treating the crossing portion equivalent to the marker portion as by the recognition method using Tables 2 to 5, or by deeming the crossing portion as the marker portion in the area color flag generation circuit by the recognition method using Tables 6 to 9. The reference for determining the image portion can be altered by altering the texture reference level 410 in the texture detect circuit 411 of the ghost cancel device 42. Accordingly, the reference for determining the crossing portion in the area recognition device 63 can be altered. This realizes detection of the crossing portion irrespective of the types of document.

In this embodiment, with use of the line processing for the area recognition, there is eliminated the use of a page memory for storing image data. A real time area recognition is realized.

In the above-mentioned embodiment, detection of the crossing portion of the marker and the image depends on density data. Color data may be used instead of the density data. In this case, where the broken portion of the marker contains color data of a color other than the texture color of the original document and the surrounding pixels have a given color pattern, the pixel is determined to belong to the crossing portion.

It is evident that the present invention is applicable to the recognition of an edit area of an image on the screen of a display device, in addition to the area recognition on the original document. While the image area recognition is based on the three directions in the embodiment, the image area can be recognized using four or more directions.

The LUT (RAM 403) in the hue determining device 41 as shown in FIG. 5, the LUT 601 in the area determining circuit 600 as shown in FIG. 22, and the LUT 623 in the area flag generating circuit 620 as shown in FIG. 23 may be constructed with memory elements, such as RAMs and ROMs, and logic gates.

As described above, according to the present invention, the crossing portion of a mark portion and an image portion is detected, and a closed loop formed by the mark portion and the crossing portion is recognized. Accordingly, an area recognition is possible even when the mark for designating an area crosses an image.

Further, the reference for recognizing the crossing portion of the mark portion and the image portion can be altered. With this feature, the crossing portion can be detected irrespective of the types of document.

The foregoing description of the preferred embodiment of the present invention has been presented for purposes of illustration and description. It is not intended to be exhaustive or to limit the present invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated.

What is claimed is:

1. An area recognition apparatus comprising:

scan reading means for reading image data by scanning an original document line by line in main-scan and sub-scan directions said image data image data including density data;

a plurality of image processing devices for processing in parallel said image data from said scan reading means, each of said image processing devices corresponding to different respective areas on each line, scanned and each of said image processing devices includes mark portion detecting means for detecting a mark portion from said image data, and crossing portion detecting means for detecting a crossing portion where said mark portion crosses a predetermined portion on the original document in accordance with said image data;

parallel-to-serial converting means for converting outputs of said image processing devices containing results detected by said mark portion detecting means and said crossing portion detecting means into serial data corresponding to the areas on each line;

closed area recognizing means for recognizing a closed area formed by said mark portion and said crossing portion based on the serial data from said parallel-to-serial converting means and outputting serial data containing results of said recognition; and serial-to-parallel converting means for converting the serial data output from said closed area recognizing means to parallel data.

2. The area recognition apparatus according to claim 1, wherein said closed area recognizing means includes area determining means for determining an area to be inside or outside said closed area.

3. The area recognition apparatus according to claim 2, wherein said closed area recognizing means recognizes an area by treating said crossing portion as a part of said mark portion.

4. The area recognition apparatus according to claim 1, wherein said closed area recognizing means includes area determining means for determining an area to be inside or outside said closed area and an area of said mark portion.

5. The area recognition apparatus according to claim 4, wherein said area determining means deems said crossing portion as a part of said mark portion.

6. The area recognition apparatus according to claim 1, wherein said crossing portion detecting means includes reference altering means for altering a texture reference of said image data for determining said crossing portion.

7. The area recognition apparatus according to claim 1, wherein said crossing portion detecting means includes predetermined portion detecting means for detecting said predetermined portion on the original document by comparing said density data contained in said image data with a variable density reference, and includes crossing portion determining means for determining whether or not said predetermined portion detected by said predetermined portion detecting means consists of said crossing portion.

8. The area recognition apparatus according to claim 1, wherein said crossing portion detecting means determines whether or not a target pixel belongs to said crossing portion in accordance with a pattern of said image data of said target pixel and pixels surrounding said target pixel.

* * * * *

UNITED STATES PATENT AND TRADEMARK OFFICE
CERTIFICATE OF CORRECTION

PATENT NO. :   5,465,307
DATED      :   November 07, 1995
INVENTOR(S) :  Kengo AZUMAYA et al.

It is certified that error appears in the above-indentified patent and that said Letters Patent is hereby corrected as shown below:

```
Claim 1, column 33, line 19, "line, scanned"
should read --line scanned,--.
```

Signed and Sealed this

Twenty-ninth Day of October 1996

Attest:

BRUCE LEHMAN

*Attesting Officer*        *Commissioner of Patents and Trademarks*